(12) United States Patent
Choi et al.

(10) Patent No.: US 10,701,701 B2
(45) Date of Patent: *Jun. 30, 2020

(54) METHOD AND DEVICE FOR ALLOCATING RESOURCE UNIT ON BASIS OF CONTAINER IN WIRELESS LAN

(71) Applicant: LG ELECTRONICS INC., Seoul (KR)

(72) Inventors: Jinsoo Choi, Seoul (KR); Hangyu Cho, Seoul (KR); Wookbong Lee, Seoul (KR); Jeongki Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/257,613

(22) Filed: Jan. 25, 2019

(65) Prior Publication Data

US 2019/0159212 A1 May 23, 2019

Related U.S. Application Data

(63) Continuation of application No. 15/524,555, filed as application No. PCT/KR2015/011855 on Nov. 5, 2015, now Pat. No. 10,231,243.

(Continued)

(51) Int. Cl.
*H04W 72/04* (2009.01)
*H04L 5/00* (2006.01)
(Continued)

(52) U.S. Cl.
CPC ........... *H04W 72/0486* (2013.01); *H04L 5/00* (2013.01); *H04L 5/0007* (2013.01);
(Continued)

(58) Field of Classification Search
CPC .. H04W 72/0486; H04W 72/121; H04L 5/00; H04L 5/0007; H04L 5/0094
See application file for complete search history.

(56) References Cited

U.S. PATENT DOCUMENTS 9,397,737 B2 7/2016 Seok et al.
10,231,243 B2 * 3/2019 Choi .................. H04L 5/00
(Continued)

FOREIGN PATENT DOCUMENTS

CN 103947143 7/2014
EP 2988462 2/2016
(Continued)

OTHER PUBLICATIONS

European Patent Office Application Serial No. 15856745.3, Search Report dated Jun. 5, 2018, 10 pages.

(Continued)

*Primary Examiner* — Chi H Pham
*Assistant Examiner* — Weibin Huang
(74) *Attorney, Agent, or Firm* — Lee, Hong, Degerman, Kang & Waimey

(57) ABSTRACT

Disclosed are a method and a device for allocating a resource unit on the basis of a container in a wireless LAN. The method for allocating a resource unit in a wireless LAN comprises the steps of: generating, by an AP, a PPDU to be transmitted to a plurality of STAs; and transmitting, by the AP, the PPDU to the plurality of STAs through at least one container allocated on the entire frequency band, wherein the PPDU includes MU/SU transmission indication information and resource allocation information for each container, the MU/SU transmission indication information includes information on whether an SU-based transmission or an MU-based transmission is carried out on the entire bandwidth, and the resource allocation information for each (Continued)

container can include information on the number of STAs allocated to each of the at least one container.

11 Claims, 19 Drawing Sheets

Related U.S. Application Data

(60) Provisional application No. 62/088,688, filed on Dec. 8, 2014, provisional application No. 62/075,272, filed on Nov. 5, 2014.

(51) Int. Cl.
  *H04W 72/12* (2009.01)
  *H04W 84/12* (2009.01)
(52) U.S. Cl.
  CPC ......... *H04L 5/0094* (2013.01); *H04W 72/121* (2013.01); *H04W 84/12* (2013.01)

(56) References Cited

U.S. PATENT DOCUMENTS

| | | | |
|---|---|---|---|
| 10,361,834 B2* | 7/2019 | Azizi | H04L 5/0064 |
| 2011/0002319 A1 | 1/2011 | Husen et al. | |
| 2011/0255620 A1* | 10/2011 | Jones, IV | H04L 5/0046 |
| | | | 375/260 |
| 2012/0008585 A1* | 1/2012 | Kwon | H04L 5/0007 |
| | | | 370/329 |
| 2012/0327871 A1 | 12/2012 | Ghosh et al. | |
| 2013/0148644 A1 | 6/2013 | Sim et al. | |
| 2013/0259017 A1* | 10/2013 | Zhang | H04W 84/02 |
| | | | 370/338 |
| 2014/0294020 A1 | 10/2014 | You et al. | |
| 2014/0307612 A1* | 10/2014 | Vermani | H04L 27/2613 |
| | | | 370/312 |
| 2014/0328430 A1 | 11/2014 | Park et al. | |
| 2015/0350988 A1* | 12/2015 | Himayat | H04W 36/22 |
| | | | 370/331 |
| 2016/0119933 A1 | 4/2016 | Merlin et al. | |
| 2017/0339701 A1 | 11/2017 | Choi et al. | |

FOREIGN PATENT DOCUMENTS

| | | |
|---|---|---|
| KR | 20120095434 | 8/2012 |
| WO | 2014171788 | 10/2014 |
| WO | 2017035235 | 3/2017 |

OTHER PUBLICATIONS

Japan Patent Office Application No. 2017-524017, Office Action dated Jun. 12, 2018, 4 pages.
Stacey, R., "Specification Framework for TGax, IEE P802.11 Wireless LANs", doc.: IEEE 802.11-15/0132r9, Sep. 2015, 22 pages.
Josiam, K. et al., "HE-SIG-B Contents", doc.: IEEE 802.11-15/1066r0, Sep. 2015, 25 pages.
Stacey, R., "Specification Framework for TGax", IEEE P802.11 Wireless LANs, doc.: IEEE 802.11-15/0132r10, Nov. 2015, 34 pages.
PCT International Application No. PCT/KR2015/011855, Written Opinion of the International Searching Authority dated Feb. 18, 2016, 4 pages.
Seok, et al, "HEW PPDU Format for Supporting MIMO-OFDMA", doc.: IEEE 802.11-14/1210r1, Sep. 2014, 18 pages.
The State Intellectual Property Office of the People's Republic of China Application Serial No. 201580060402.3, Office Action dated Sep. 12, 2019, 6 pages.
European Patent Office Application Serial No. 20151696.0, Search Report dated Apr. 7, 2020, 8 pages.

* cited by examiner

MU MIMO transmission
Maximum of 4 STAs supported

METHOD AND DEVICE FOR ALLOCATING RESOURCE UNIT ON BASIS OF CONTAINER IN WIRELESS LAN

CROSS-REFERENCE TO RELATED APPLICATIONS

This application is a continuation of U.S. patent application Ser. No. 15/524,555, filed on May 4, 2017, now U.S. Pat. No. 10,231,243, which is the National Stage filing under 35 U.S.C. 371 of International Application No. PCT/KR2015/011855, filed on Nov. 5, 2015, which claims the benefit of U.S. Provisional Application No. 62/075,272, filed on Nov. 5, 2014, and 62/088,688, filed on Dec. 8, 2014, the contents of which are all hereby incorporated by reference herein in their entirety.

BACKGROUND OF THE INVENTION

Field of the Invention

The present invention relates to wireless communication and, most particularly, to a method and device for allocating a resource unit on the basis of a container in a wireless LAN.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY OF THE INVENTION

Technical Objects

An object of the present invention is to provide a method for allocating a resource unit on the basis of a container in a wireless LAN.

Another object of the present invention is to provide a device for allocating a resource unit on the basis of a container in a wireless LAN.

Technical Solutions

In order to achieve the above-described technical object of the present invention, according to an aspect of the present invention, a method for allocating resource units in a wireless LAN may include the steps of generating, by an access point (AP), a PHY layer protocol data unit (PPDU) that is to be transmitted to a plurality of stations (STAs), and transmitting, by the AP, the PPDU to the plurality of STAs through at least one container that is allocated within an entire frequency bandwidth, wherein the PPDU may include multiple user (MU)/single user (SU) transmission indication information and per container resource allocation information, wherein the MU/SU transmission indication information may include information on whether SU based transmission is performed or MU based transmission is performed within the entire bandwidth, wherein the per container resource allocation information may include information on a number of STAs being allocated to each of the at least one container, wherein each of the at least one container may include one first resource unit or a plurality of second resource units, and wherein a number of tones corresponding to the first resource unit may be greater than a number of tones corresponding to the second resource unit.

In order to achieve the above-described technical object of the present invention, according to another aspect of the present invention, an access point (AP) allocating resource units in a wireless LAN may include a radio frequency (RF) unit transmitting and receiving radio signals, and a processor being operatively connected to the RF unit, wherein the processor may be configured to generate a PHY layer protocol data unit (PPDU) that is to be transmitted to a plurality of stations (STAs), and to transmit the PPDU to the plurality of STAs through at least one container that is allocated within an entire frequency bandwidth, wherein the PPDU may include multiple user (MU)/single user (SU) transmission indication information and per container resource allocation information, wherein the MU/SU transmission indication information may include information on whether SU based transmission is performed or MU based transmission is performed within the entire bandwidth, wherein the per container resource allocation information may include information on a number of STAs being allocated to each of the at least one container, wherein each of the at least one container may include one first resource unit or a plurality of second resource units, and wherein a number of tones corresponding to the first resource unit may be greater than a number of tones corresponding to the second resource unit.

Effects of the Invention

When allocating a wireless resource for each of a plurality of STAs based on orthogonal frequency division multiple access (OFDMA), resource allocation to each of the plurality of STAs may be performed by using wireless resource units each being defined to have a different size. Accordingly, scheduling flexibility may be enhanced, and throughput of the wireless LAN may be increased. By scheduling resource units based on a container, a level of complexity for scheduling the resource unit allocation may be decreased.

DESCRIPTION OF EXEMPLARY EMBODIMENTS

Figure 1:
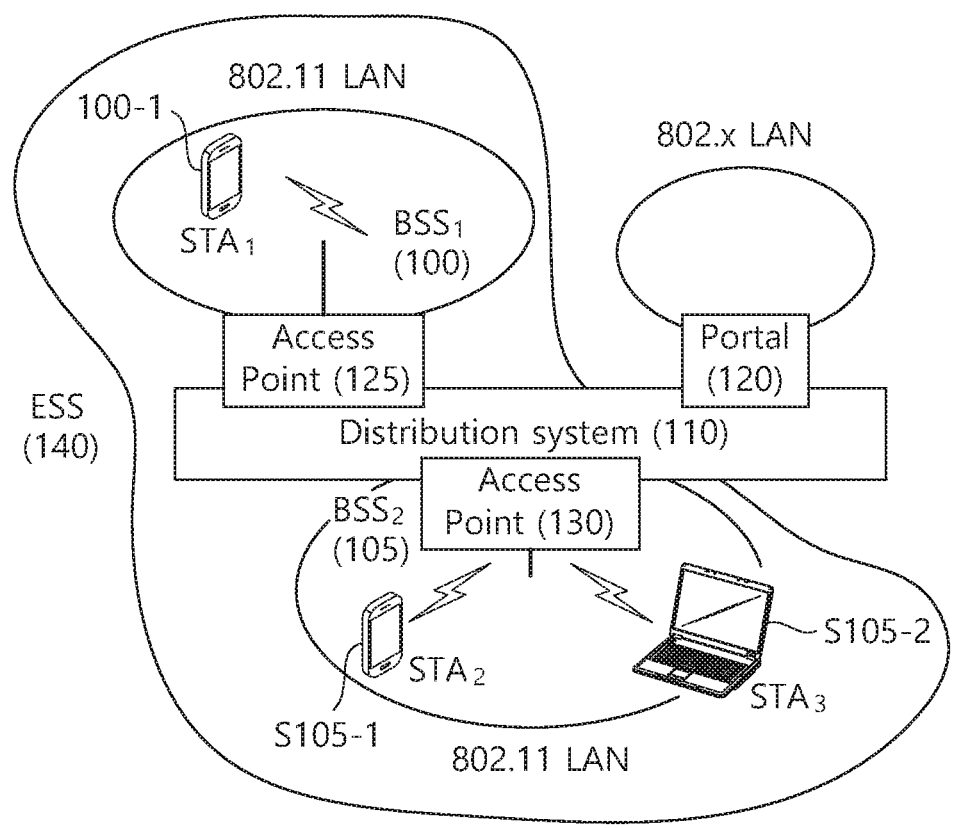
FIG. 1 is a conceptual view illustrating the structure of a wireless local area network (WLAN)
Figure 1:
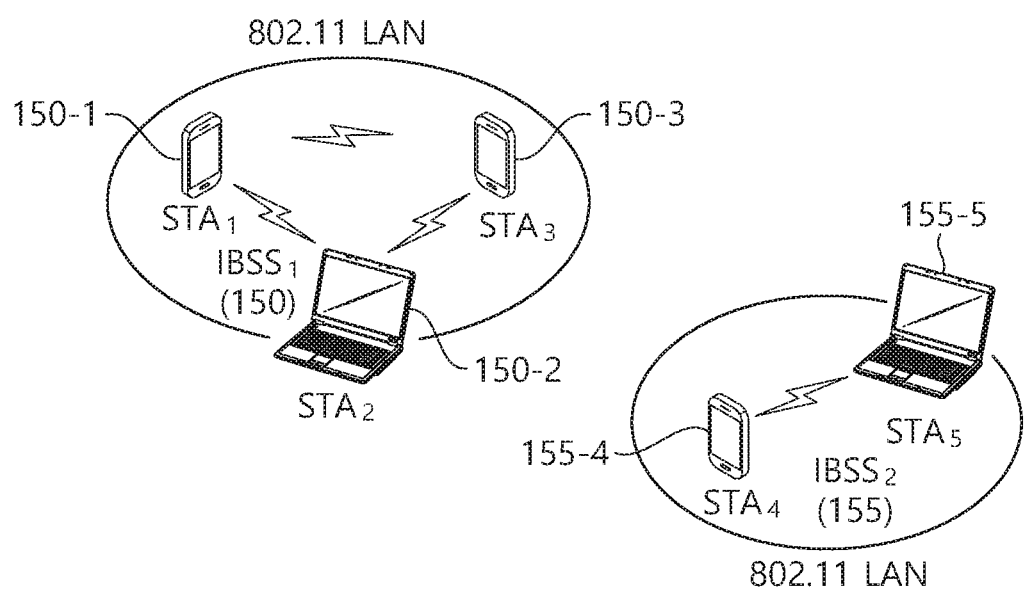

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Hereinafter, in the embodiment of the present invention, data (alternatively, or a frame) which the AP transmits to the STA may be expressed as a term called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the conventional wireless LAN system, the whole bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In the wireless LAN system according to the embodiment, an orthogonal frequency division multiple access (OFDMA) based transmission method is supported for the uplink transmission and/or downlink transmission. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs) (alternatively, basic tone units or small tone units). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

An example of a time-frequency structure, which is assumed in the WirelessLAN system according to this exemplary embodiment may be as described below.

A fast fourier transform (FFT) size/inverse fast fourier transform (IFFT) size may be defined as N-times (wherein N is an integer, e.g., N=4) of the FFT/IFFT sizes that were used in the legacy WirelessLAN system. More specifically, as compared to the first part of the HE PPDU, the 4-times size of the FFT/IFFT may be applied to the second part of the HE PPDU. For example, 256FFT/IFFT may be applied for a 20 MHz bandwidth, 512FFT/IFFT may be applied for a 40 MHz bandwidth, 1024FFT/IFFT may be applied for an 80 MHz bandwidth, and 2048FFT/IFFT may be applied to a continuous 160 MHz bandwidth or a non-continuous 160 MHz bandwidth.

Subcarrier space/spacing may correspond to a 1/N-times size (wherein N is an integer, e.g., when N=4, 78.125 kHz) of the subcarrier spacing that was used in the legacy WirelessLAN system.

An IDFT/DFT length (or valid symbol length) that is based on inverse discrete fourier transform (IDFT)/discrete fourier transform (DFT) (or FFT/IFFT) may correspond to N-times of the IDFT/DFT length in the legacy WirelessLAN system. For example, in the legacy WirelessLAN system, in case the IDFT/DFT length is equal to 3.2 μs and N=4, in the WirelessLAN system according to this exemplary embodiment, the IDFT/DFT length may be equal to 3.2 μs*4(=12.8 μs).

The length of an OFDM symbol may correspond to the IDFT/DFT length having a length of a guard interval (GI) added thereto. The length of the GI may have diverse values, such as 0.4 μs, 0.8 μs, 1.6 μs, 2.4 μs, and 3.2 μs.

In case of the OFDMA based resource allocation method according to the exemplary embodiment of the present invention, resource allocation units each defined to have a different size may be used. More specifically, a basic resource unit for the OFDMA based resource allocation may be defined as a resource unit of 26 tones and a resource unit of 242 tones. For example, a resource unit of 26 tones may include a data tone of 24 tones and a pilot tone of 2 tones. A resource tone of 242 tones may include a data tone of 234 tones and a pilot tone of 8 tones. By applying an interleaver having a size of 234 to the resource unit of 242 tones, and by applying an interleaver having a size of 24 to the resource unit of 26 tones, interleaving may be performed on the data tone. A tone may be interpreted to have the same meaning as a subcarrier.

A number of pilot tones/data tones and allocation positions that are based on the 242-tone numerology of the conventional IEEE 802.11ac may be applied to the basic resource unit of 242 tones. The number of pilot tones/data tones and allocation positions that are based on the 242-tone numerology of the conventional IEEE 802.11ac are disclosed in 22.3.10.10 Pilot subcarriers of IEEE Standard for Information technology telecommunications and information exchange between systems local and metropolitan area networks specific requirements 'Part 11: Wireless LAN Medium Access Control (MAC) and Physical Layer (PHY) Specifications Amendment 4: Enhancements for Very High Throughput for Operation in Bands below 6 GHz.

The 242-tone resource unit may correspond to a virtual allocation resource unit. The virtual allocation resource unit may be generated based on a combination of resource units that are smaller than the virtual allocation resource unit. For example, the 242-tone resource unit may correspond to a combination of a plurality of 26-tone resource units and additional leftover tones or a combination of 121-tone resource units. The virtual allocation resource unit may correspond to a resource unit for re-using an interleaver size and OFDM numerology (or tone numerology) of the conventional wireless LAN system.

A number of pilot tones/data tones and allocation positions that are based on the 26-tone numerology of the conventional IEEE 802.11ah may be applied to the basic resource unit of 26 tones. The number of pilot tones/data tones and allocation positions that are based on the 26-tone numerology of the conventional IEEE 802.11ah are disclosed in 24.3.9.10 Pilot subcarriers of EEE P802.11ah™/D5.0 Draft Standard for Information technology telecommunications and information exchange between systems Local and metropolitan area network specific requirements 'Part 11: Wireless LAN Medium Access Control (MAC) and Physical Layer (PHY) Specifications Amendment 2: Sub 1 GHz License Exempt Operation'.

The AP may determine a downlink transmission resource and/or an uplink transmission resource for at least one STA based on resource units each having a different size, as described above. The AP may transmit at least one PPDU to at least one STA through the scheduled downlink transmission resource. Additionally, the AP may receive at least one PPDU that is transmitted by at least one STA through the scheduled uplink transmission resource.

The basic resource unit may be allocated within the entire bandwidth (or available bandwidth) while considering a left guard tone and a left guard tone, which are respectively positioned on each end of the entire bandwidth for interference mitigation, and a direct current (DC) tone, which is positioned at a center of the bandwidth. Moreover, the basic resource unit may also be allocated while considering leftover tones (or remaining tones) that may be used for the purpose of user allocation separation (or per STA resource allocation), common pilot, automatic gain control (AGC), phase tracking, and so on.

The allocation method (allocation number, allocation location, etc.) of the basic resource unit within the entire bandwidth may be configured by considering resource application efficiency, scalability (or extendibility) according to the entire bandwidth. The allocation method of the basic resource unit may be defined in advance or may be signaled based on diverse methods (e.g., signaling based on a signal field that is included in a PPDU header of a PPDU).

Hereinafter, a detailed resource allocation method that is based on the basic resource unit will be disclosed.

According to the exemplary embodiment of the present invention, the tone numerology corresponding to each of the bandwidths of 20 MHz, 40 MHz, and 80 MHz may be as described below. The following resource allocation method corresponding to each bandwidth is merely exemplary, and, therefore, resource allocation within each bandwidth may be performed by using diverse methods in addition to the method that is described above.

In the 20 MHz bandwidth, the left guard tone may be defined as 6 tones, the direct current (DC) tone may be defined as 3 tones, and the right guard tone may be defined as 5 tones. In the 20 MHz bandwidth, resource allocation within the bandwidth may be performed based on a 26-tone resource unit and/or a 242-tone resource unit.

In the 40 MHz bandwidth, the left guard tone may be defined as 6 tones, the DC tone may be defined as 9 tones, and the right guard tone may be defined as 5 tones. In the 40 MHz bandwidth, 492 tones are available for usage, and the resource allocation within the bandwidth may be performed based on a 26-tone resource unit and/or a 242-tone resource unit on the 492 tones.

In the 40 MHz bandwidth, the left guard tone may be defined as 6 tones, the DC tone may be defined as 5 tones, and the right guard tone may be defined as 5 tones. In the 40 MHz bandwidth, 496 tones are available for usage, and the resource allocation within the bandwidth may be performed based on a 26-tone resource unit and/or a 242-tone resource unit on the 496 tones.

In the 80 MHz bandwidth, the left guard tone may be defined as 11 tones, the DC tone may be defined as 3 tones, and the right guard tone may be defined as 10 tones. In the 80 MHz bandwidth, 1000 tones are available for usage, and the resource allocation within the bandwidth may be performed based on a 26-tone resource unit and/or a 242-tone resource unit on the 1000 tones.

In the 80 MHz bandwidth, the left guard tone may be defined as 6 tones, the DC tone may be defined as 5 tones, and the right guard tone may be defined as 5 tones. In the 80 MHz bandwidth, 1008 tones are available for usage, and the resource allocation within the bandwidth may be performed based on a 26-tone resource unit and/or a 242-tone resource unit on the 1008 tones.

Although description of the leftover tone is not indicated on the drawing for simplicity, the leftover tone may be positioned between the 26-tone resource unit and the 242-tone resource unit.

Figure 2:
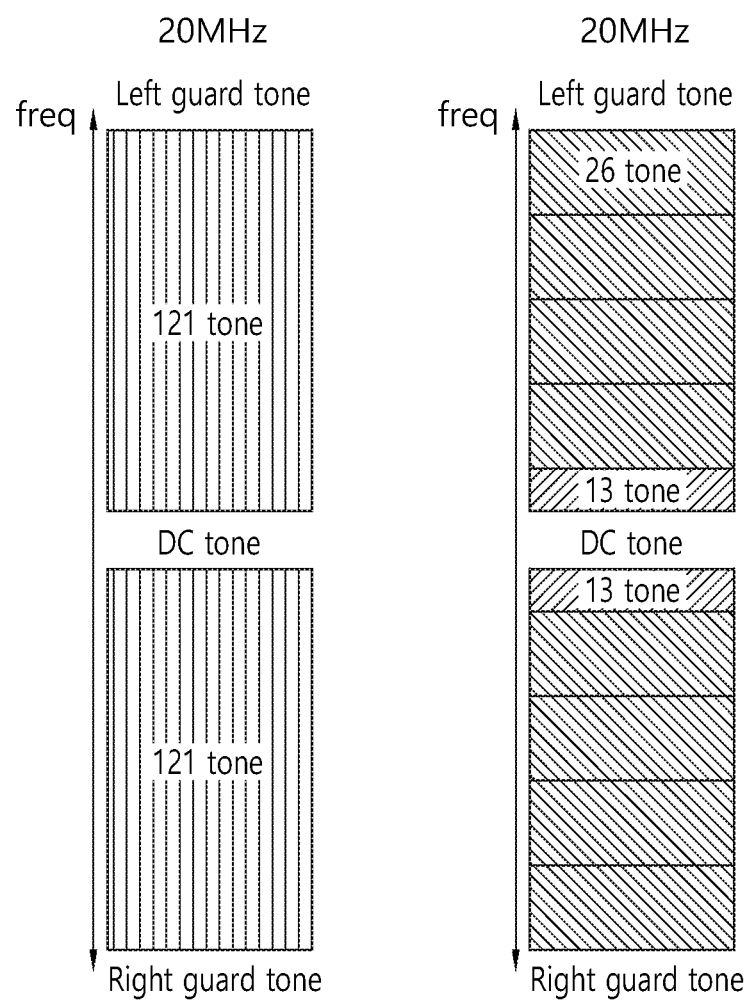
FIG. 2 is a conceptual view illustrating an allocation of resource units within a 20 MHz bandwidth according to an exemplary embodiment of the present invention.

FIG. 2 is a conceptual view illustrating an allocation of resource units within a 20 MHz bandwidth according to an exemplary embodiment of the present invention.

FIG. 2 discloses the allocation of 242-tone resource units/26-tone resource units within a 20 MHz bandwidth and a signaling method for the resource allocation.

Referring to a left side of FIG. 2, one 242-tone resource unit may be allocated to the available tones within the 20 MHz bandwidth. The available tones may correspond to the remaining tones after excluding the left guard tone, the right guard tone, and the DC tone. The 242-tone resource unit may correspond to a combination of two 121-tone divided resource units based on the DC tone.

One 242-tone resource unit may be allocated to one STA within the 20 MHz bandwidth. One 242-tone resource unit may be allocated to one STA within the 20 MHz bandwidth for a single user (SU) based transmission. In case one 242-tone resource unit is allocated to one STA within the 20 MHz bandwidth, separate resource allocation information may not be included in a header of a PPDU. Also, in case a MU OFDMA transmission is not performed, and in case resources for a plurality of STAs are multiplexed and allocated to one 242-tone resource unit for MU-MIMO transmission, separate resource allocation information may not be included in a header of a PPDU. In this case, information on the number of STAs being allocated for MU-MIMO may be included in the header of a PPDU. An STA may know that one 242-tone resource unit has been allocated to one STA within the 20 MHz bandwidth based only on information on the size of the entire (or total) bandwidth (e.g., 20 MHz) and information on an STA being allocated within the entire bandwidth (information indicating that only the STA has been allocated within the entire bandwidth).

Referring to a right side of FIG. 2, only 26-tone resource units may be used for the resource allocation corresponding to each of the plurality of STAs without any allocation of 242-tone resource units. For example, one STA may be allocated with at least one 26-tone resource unit within the 20 MHz bandwidth.

A maximum of 9 26-tone resource units may be allocated within the 20 MHz bandwidth. In case each of the 9 26-tone resource units are allocated to each of the plurality of STAs, one STA may be allocated with one 26-tone resource unit. More specifically, in case a 26-tone resource unit is allocated, resource may be simultaneously allocated to a maximum of 9 STAs within the 20 MHz bandwidth. One 26-tone resource unit may be divided into two 13-tone divided resource units based on the DC tone.

The allocation positions of each of the plurality of (e.g., 9) 26-tone resource units within the 20 MHz bandwidth may be fixed, and each of the plurality of 26-tone resource units being sequentially positioned on the frequency axis may be sequentially allocated to individual STAs based on resource unit allocation signaling (or signaling indication).

Figure 3:
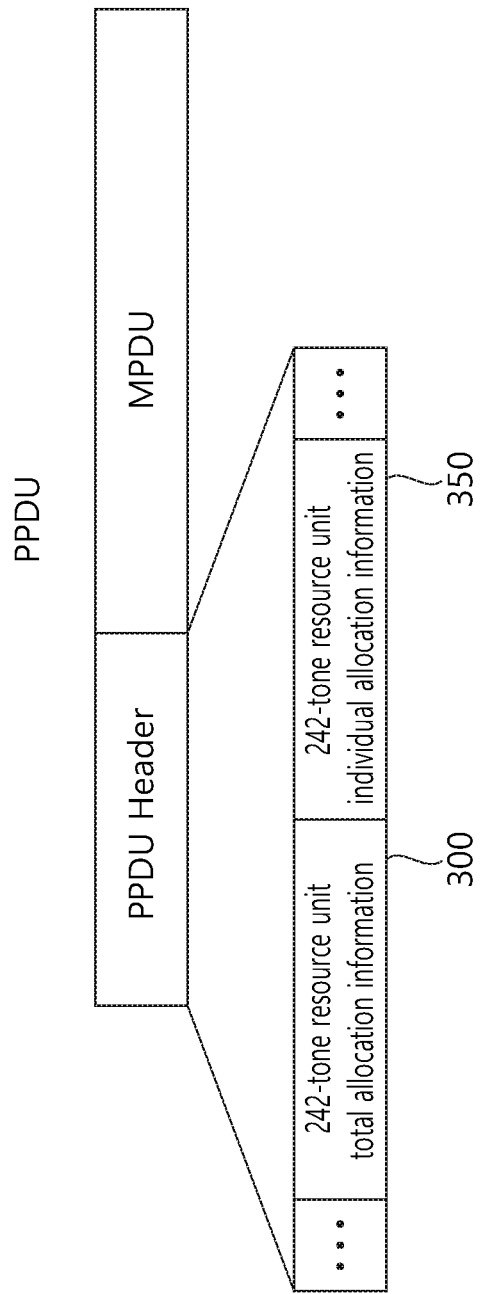
FIG. 3 is a conceptual view illustrating a method for signaling resource unit allocation information according to the exemplary embodiment of the present invention.

FIG. 3 is a conceptual view illustrating a method for signaling resource unit allocation information according to the exemplary embodiment of the present invention.

Referring to FIG. 3, n bits (e.g., 1 bit) may be allocated as information on the allocation of 242-tone resource units (hereinafter referred to as 242-tone resource unit total allocation information 300) within a 20 MHz bandwidth. The n-bit 242-tone resource unit total allocation information 300 may include information on whether or not 242-tone resource units are being allocated within the 20 MHz bandwidth. The STA may determine whether or not to allocate 242-tone resource units within the 20 MHz bandwidth based on the 242-tone resource unit total allocation information 300. For example, in case the value of the 1-bit 242-tone resource unit total allocation information 300 is equal to 1, allocation of the 242-tone resource units within the 20 MHz bandwidth may be indicated, and, in case the value of the 1-bit 242-tone resource unit total allocation information 300 is equal to 0, non-allocation of the 242-tone resource units within the 20 MHz bandwidth may be indicated.

In case 242-tone resource units are allocated within the 20 MHz bandwidth, SU-based transmission is performed, and, in case 242-tone resource units are not allocated within the 20 MHz bandwidth, MU-based transmission is performed. Accordingly, in other words, the 242-tone resource unit total allocation information 300 may be interpreted by a meaning of indicating whether SU-based transmission is performed or whether MU-based transmission is performed.

Additionally, n bits (e.g., 2 bits) may be allocated as information on the allocation of 26-tone resource units to individual STAs (hereinafter referred to as 26-tone resource unit individual allocation information 350) within the 20 MHz bandwidth. The 2-bit 26-tone resource unit individual allocation information 350 may inform allocation of 26-tone resource units to individual STAs. In case the 242-tone resource unit total allocation information 300 indicates the allocation of 242-tone resource units within the 20 MHz bandwidth, 26-tone resource units may not be allocated for the STA. In this case, the 26-tone resource unit individual allocation information 350 may also be used as another type of information. Alternatively, in case the 242-tone resource unit total allocation information 300 indicates the allocation of one 242-tone resource unit within the 20 MHz bandwidth, the STA may not perform decoding on the 26-tone resource unit individual allocation information 350.

For example, the 2-bit 26-tone resource unit individual allocation information 350 having the value of '00' may indicate the allocation of one 26-tone resource unit to the STA.

The 2-bit 26-tone resource unit individual allocation information 350 having the value of '01' may indicate the allocation of two 26-tone resource units to the STA. In case two 26-tone resource units are allocated to the STA, four leftover tones may also be allocated along with the two 26-tone resource units. The combination of two 26-tone resource units and four leftover tones may be used as one 56-tone resource unit. A position of a pilot tone being included in the 56-tone resource unit, which is generated based on the combination of two 26-tone resource units and four leftover tones, may be the same as the position of the pilot tone conventionally defined in each of the two 26-tone resource units in the conventional IEEE802.11ah spec, or may be the same as the position of the pilot tone conventionally defined in the 56-tone resource unit in the conventional IEEE802.11ac spec. The position of the pilot tone that is defined in the conventional 56-tone resource unit is disclosed in 22.3.10.10 Pilot subcarriers of the above-described IEEE 802.11ac spec.

The 2-bit 26-tone resource unit individual allocation information 350 having the value of '10' may indicate the allocation of three 26-tone resource units to the STA.

The 2-bit 26-tone resource unit individual allocation information 350 having the value of '11' may indicate the allocation of four 26-tone resource units to the STA. In case eight leftover tones are allocated along with the four 26-tone resource units, the STA may be allocated with a total of 112(26*4+8) tones. In this case, in order to re-use the processing procedure (e.g., 108-size interleaver) that was applied to the 114-tone resource unit (108-tone data tone and 6-tone pilot tone), which is defined in the conventional IEEE802.11ac spec, only four pilot tones may be allocated with the 112-tone resource unit and the remaining 108 tones may be allocated as the data tone.

More specifically, the 112-tone resource unit corresponding to four 26-tone resource units may be configured of a 108-tone data tone and a 4-tone pilot tone. The positions of each of four pilot tones included in the 112-tone resource unit may be the same as the positions corresponding to each of the four 26-tone resource units being included in the 112-tone resource unit. Alternatively, each of the four pilot tones being included in the 112-tone resource unit may be equally allocated to the frequency axis corresponding to the 112-tone resource unit without considering the positions of each of the 4 26-tone resource units being included in the 112-tone resource unit. Alternatively, among the six pilot tones being allocated to the legacy (or conventional) 114-tone resource unit, only 4 pilot tones may be selected and defined as the pilot tones of the 112-tone resource unit.

A minimum of 1 STA and a maximum of 9 STAs may be supported within the 20 MHz bandwidth based on the 242-tone resource units and the 26-tone resource units.

As described above, the STA may be operated within the 20 MHz bandwidth by being allocated with 1 242-tone resource unit or 1, 2, 3, or 4 26-tone resource unit(s).

Table 1 shown below indicates an exemplary allocation of the resource units in accordance with the number of supported STAs.

TABLE 1

| Number of STAs | Resource Allocation |
| --- | --- |
| 1 | STA1: 242-tone (1) |
| 2 | STA1: 26-tone (4) |
|   | STA2: 26-tone (4) |
| 3 | STA1: 26-tone (3) |
|   | STA2: 26-tone (3) |
|   | STA3: 26-tone (3) |
| 4 | STA1: 26-tone (2) |
|   | STA2: 26-tone (2) |
|   | STA3: 26-tone (2) |
|   | STA4: 26-tone (3) |
| 5 | STA1: 26-tone (2) |
|   | STA2: 26-tone (2) |
|   | STA3: 26-tone (2) |
|   | STA4: 26-tone (2) |
|   | STA5: 26-tone (1) |
| 6 | STA1: 26-tone (2) |
|   | STA2: 26-tone (2) |
|   | STA3: 26-tone (2) |
|   | STA4: 26-tone (1) |
|   | STA5: 26-tone (1) |
|   | STA6: 26-tone (1) |
| 7 | STA1: 26-tone (2) |

TABLE 1-continued

| Number of STAs | Resource Allocation |
| --- | --- |
|   | STA2: 26-tone (2) |
|   | STA3: 26-tone (1) |
|   | STA4: 26-tone (1) |
|   | STA5: 26-tone (1) |
|   | STA6: 26-tone (1) |
|   | STA7: 26-tone (1) |
| 8 | STA1: 26-tone (2) |
|   | STA2: 26-tone (1) |
|   | STA3: 26-tone (1) |
|   | STA4: 26-tone (1) |
|   | STA5: 26-tone (1) |
|   | STA6: 26-tone (1) |
|   | STA7: 26-tone (1) |
|   | STA8: 26-tone (1) |
| 9 | STA1: 26-tone (1) |
|   | STA2: 26-tone (1) |
|   | STA3: 26-tone (1) |
|   | STA4: 26-tone (1) |
|   | STA5: 26-tone (1) |
|   | STA6: 26-tone (1) |
|   | STA7: 26-tone (1) |
|   | STA8: 26-tone (1) |
|   | STA9: 26-tone (1) |

Figure 4:
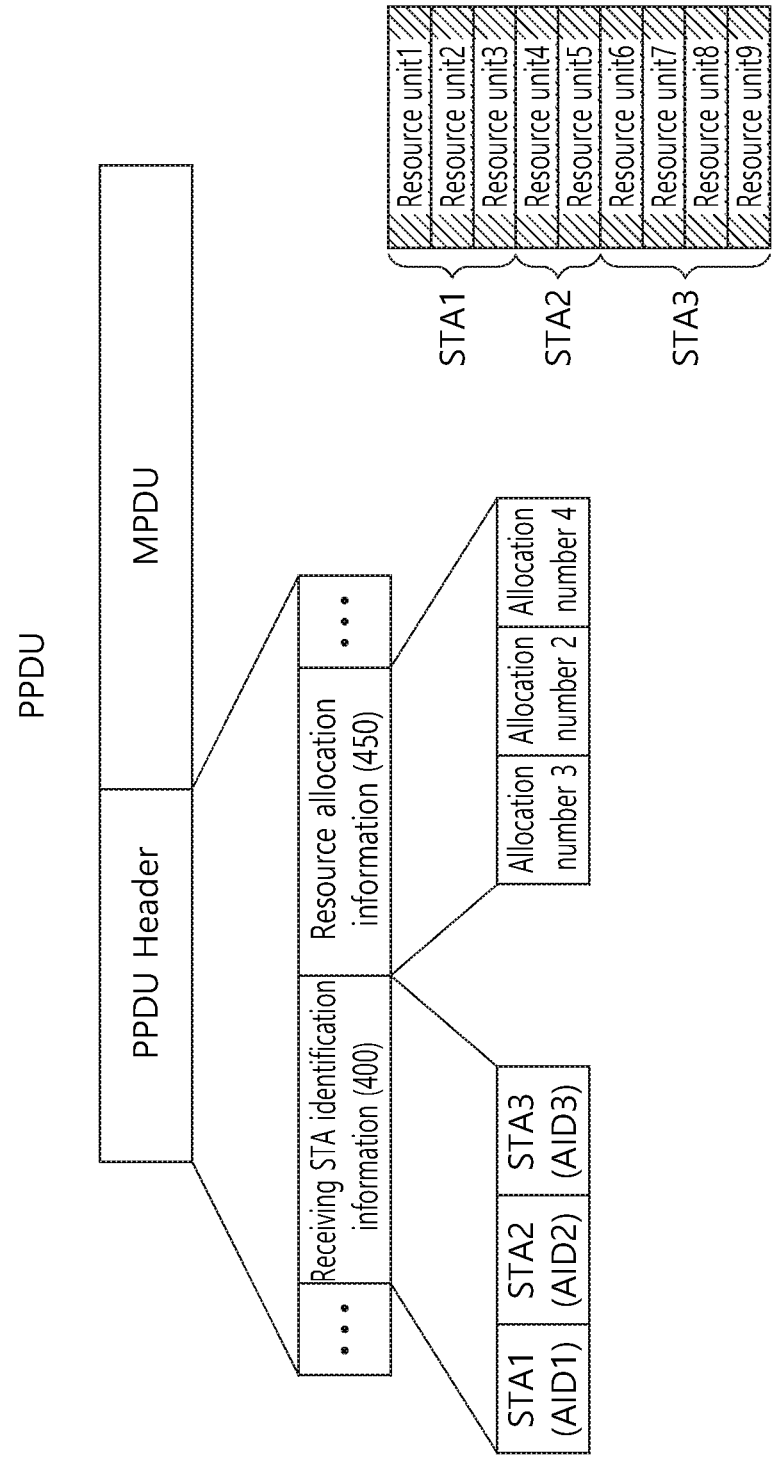
FIG. 4 is a conceptual view illustrating a signaling method for performing allocation of resource units according to the exemplary embodiment of the present invention.

FIG. 4 is a conceptual view illustrating a signaling method for performing allocation of resource units according to the exemplary embodiment of the present invention.

FIG. 4 discloses a method for allocating resource units to STAs based on identification information corresponding to a STA receiving a PPDU and information on the number of resource units being allocated to the STA.

Referring to FIG. 4, the PPDU header may include information on the plurality of STAs that are to receive the PPDU (receiving STA identification information 400) and information on the resource units that are allocated to each of the plurality of STAs for the reception of the PPDU (resource allocation information 450). The receiving STA identification information 400 may sequentially include identification information (e.g., association identifier (AID)) corresponding to each of the plurality of STAs. The resource allocation information 450 may sequentially include information on the number of resource units that are allocated to each of the plurality of STAs. For example, the resource allocation information may correspond to the 26-tone resource unit individual allocation information and the 242-tone resource unit individual allocation information, which will be described in more detail later on. The 242-tone resource unit individual allocation information may correspond to information on the number of 242-tone resource units being allocated to each individual STA.

Each of the plurality of STAs being indicated by the receiving STA identification information 400 may correspond to information on the number of resource units being allocated to each of the plurality of STAs being sequentially included in the resource allocation information 450. Each of the plurality of STAs that are sequentially indicated by the receiving STA identification information may be allocated with the resource units that are sequentially aligned on a frequency axis based on the information on the number of resource units being allocated to each of the plurality of STAs.

For example, a case when nine resource units (resource unit1 to resource unit9) are sequentially allocated on the frequency axis, and when the receiving STA identification information sequentially indicates STA1, STA2, and STA3, and when the resource allocation information sequentially indicates three, two, and four units may be assumed. In this case, STA1 may be allocated with three resource units, STA2 may be allocated with two resource units, and STA3 may be allocated with four resource units. At this point, resource unit1 to resource unit 9 may be sequentially allocated to each of STA1, STA2, and STA3 by considering the number of resource units being allocated to each of STA1, STA2, and STA3. More specifically, STA1 may be allocated with resource unit1, resource unit2, and resource unit3, and STA2 may be allocated with resource unit4 and resource unit5, and STA3 may be allocated with resource unit6, resource unit7, resource unit8, and resource unit9.

More specifically, each of the plurality of resource units sequentially positioned on the frequency axis may be continuously (or contiguously) allocated to each of the plurality of STAs based on the receiving STA identification information including information on the plurality of STAs that are to sequentially receive the PPDU and the resource allocation information including information on the number of resource units sequentially allocated to each of the plurality of STAs.

Hereinafter, in the exemplary embodiment of the present invention, the resource allocation method may also be expressed differently as a resource allocation method that is based on resource unit allocation signaling/signaling indication. The resource allocation method that is based on resource unit allocation signaling/signaling indication may indirectly indicate the resource units that are sequentially allocated to each of the plurality of STAs without any direct indication on the resource units being allocated to each of the plurality of STAs.

The resource allocation method that is based on the above-described resource unit allocation signaling/signaling indication may be separately applied to the resource units each having a different size. For example, resource unit allocation signaling for the 242-tone resource units, which is based on the 242-tone resource unit individual allocation information, and resource unit allocation signaling for the 26-tone resource units, which is based on the 26-tone individual allocation information, may be performed separately.

Figure 5:
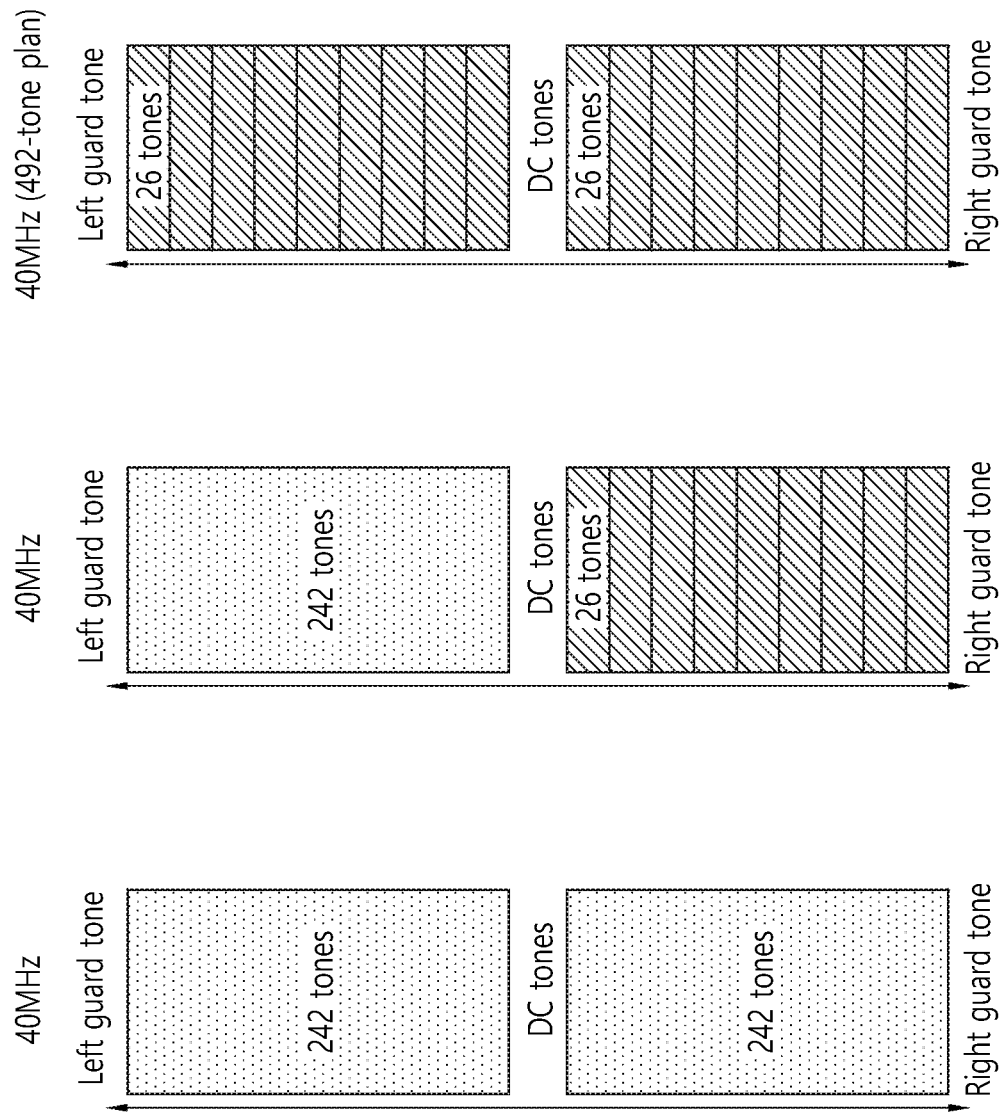
FIG. 5 is a conceptual view illustrating an allocation of resource units within a 40 MHz bandwidth according to an exemplary embodiment of the present invention.

FIG. 5 is a conceptual view illustrating an allocation of resource units within a 40 MHz bandwidth according to an exemplary embodiment of the present invention.

FIG. 5 discloses the allocation of 242-tone resource units/26-tone resource units within a 40 MHz bandwidth.

Referring to a first drawing from a left side of FIG. 5, two 242-tone resource units may be allocated to the available tones within the 40 MHz bandwidth.

Two 242-tone resource units may be allocated to one STA within the 40 MHz bandwidth. More specifically, two 242-tone resource units may be allocated to one STA within the 40 MHz bandwidth for a SU based transmission. In case two 242-tone resource units are allocated to one STA within the 40 MHz bandwidth, separate resource allocation information may not be included in a header of a PPDU. Also, in case a MU OFDMA transmission is not performed, and in case resources for a plurality of STAs are multiplexed and allocated to two 242-tone resource units for MU-MIMO transmission, separate resource allocation information may not be included in a header of a PPDU. In this case, information on the number of STAs being allocated for MU-MIMO may be included in the header of a PPDU. An STA may know that both of the two 242-tone resource unit have been allocated within the 40 MHz bandwidth based only on information on the size of the entire bandwidth (e.g., 40 MHz) and information on an STA being allocated within the entire bandwidth (information indicating that only the STA has been allocated within the entire bandwidth).

Each of the two 242-tone resource units may be respectively allocated to each of two STAs within the 40 MHz bandwidth. The 26-tone resource unit may not be used for the allocation of resource units. As described above, two STAs may be respectively allocated with each of the two 242-tone resource units based on a sequential resource unit allocation signaling within the PPDU header.

Referring to a second drawing from the left side of FIG. 5, one 242-tone resource unit is allocated to the available tones within the 40 MHz bandwidth, and a plurality of 26-tone resource units may be allocated to the remaining available tones. One 242-tone resource unit may be allocated to one STA, and the remaining plurality of 26-tone resource units may be allocated to at least one STA. For example, 9 26-tone resource units may be allocated to the remaining available tones. Each of the 9 26-tone resource units may be allocated to each of at least one of a maximum 9 STAs.

In case the above-described resource allocation is performed within the 40 MHz bandwidth, the allocation position of the 242-tone resource unit and the allocation positions corresponding to each of the plurality of 26-tone resource units may be fixed.

Each of the 242-tone resource unit and the plurality of 26-tone resource units may be individually allocated, and the plurality of 26-tone resource units may be allocated to a plurality of STAs based on resource unit allocation signaling.

Referring to a third drawing from the left side of FIG. 5, resource allocation may be performed based only on the allocation of the 26-tone resource units without performing allocation of the 242-tone resource unit to the available tones of the 40 MHz bandwidth.

For example, in case the number of available tones is equal to 492 tones (a 492-tone plan), based on the DC tone, 9 26-tone resource units may be allocated between the DC tone and the left guard tone, and 9 26-tone resource units may be allocated between the DC tone and the right guard tone. More specifically, a total of 18 26-tone resource units may be allocated on the frequency axis.

Additionally, as another example, in case the number of available tones is equal to 496 tones (a 496-tone plan), a total of 19 26-tone resource units may be allocated on the frequency axis. One 26-tone resource unit may be divided into two 13-tone divided resource unit. Based on the DC tone, 9 26-tone resource units+13-tone resource unit may be allocated between the DC tone and the left guard tone, and 9 26-tone resource units+13-tone resource unit may be allocated between the DC tone and the right guard tone. More specifically, a total of 19 26-tone resource units may be allocated on the frequency axis FIG. 6 is a conceptual view illustrating a method for signaling resource unit allocation information according to the exemplary embodiment of the present invention.

Figure 6:
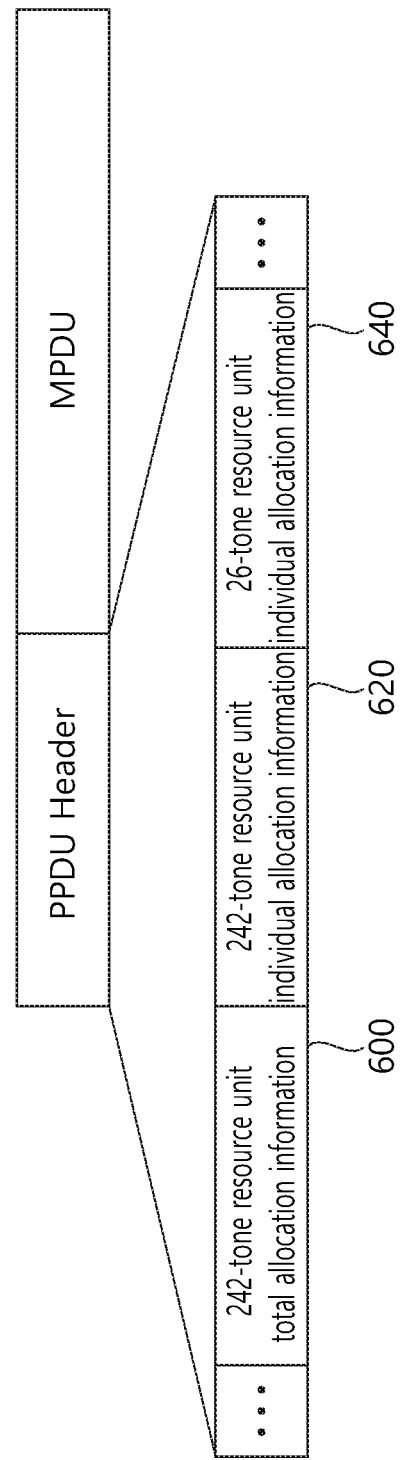
FIG. 6 is a conceptual view illustrating a method for signaling resource unit allocation information according to the exemplary embodiment of the present invention.

Referring to FIG. 6, n bits (e.g., 2 bits) may be allocated as information on the allocation of 242-tone resource units (hereinafter referred to as 242-tone resource unit total allocation information 600) within a 40 MHz bandwidth. The 242-tone resource unit total allocation information 600 may notify information on the 242-tone resource units that are allocated within the 40 MHz bandwidth.

For example, among the 2 bits included in the 242-tone resource unit total allocation information 600, one bit may indicate one 242-tone resource unit (first 242-tone resource unit), which is adjacent to the left guard tone, and the remaining one bit may indicate another 242-tone resource unit (second 242-tone resource unit), which is adjacent to the right guard tone.

For example, in case the 2-bit 242-tone resource unit total allocation information 600 is equal to '00', this may indicate that the 242-tone resource unit is not allocated within the 40 MHz bandwidth. In other words, in case the 2-bit 242-tone resource unit total allocation information 600 is equal to '00', this may indicate that MU-based transmission is performed within the 40 MHz bandwidth.

For example, in case the 2-bit 242-tone resource unit total allocation information 600 is equal to '01', this may indicate that the first 242-tone resource unit is allocated within the 40 MHz bandwidth. In other words, in case the 2-bit 242-tone resource unit total allocation information 600 is equal to '01', this may indicate that MU-based transmission is performed within the 40 MHz bandwidth.

For example, in case the 2-bit 242-tone resource unit total allocation information 600 is equal to '10', this may indicate that the second 242-tone resource unit is allocated within the 40 MHz bandwidth. In other words, in case the 2-bit 242-tone resource unit total allocation information 600 is equal to '10', this may indicate that MU-based transmission is performed within the 40 MHz bandwidth.

For example, in case the 2-bit 242-tone resource unit total allocation information 600 is equal to '11', this may indicate that the first 242-tone resource unit/the second 242-tone resource unit is/are allocated within the 40 MHz bandwidth. In other words, in case the 2-bit 242-tone resource unit total allocation information 600 is equal to '11', this may indicate that SU-based transmission is performed within the 40 MHz bandwidth.

Additionally, n bits (e.g., 1 bit) may be allocated as information on the allocation of 242-tone resource units to individual STAs (hereinafter referred to as 242-tone resource unit individual allocation information 620) within a 40 MHz bandwidth. The 242-tone resource unit individual allocation information 620 may notify information on the 242-tone resource units that are allocated to individual STAs. In case the 242-tone resource unit total allocation information 600 indicates the allocation of 0 242-tone resource units within the 40 MHz bandwidth, allocation of the 242-tone resource units to individual STAs may not be performed. In this case, the 242-tone resource unit individual allocation information 620 may be used as another type of information. Alternatively, in case the 242-tone resource unit total allocation information 600 indicates the allocation of 0 242-tone resource units within the 40 MHz bandwidth, the STA may not perform decoding on the 242-tone resource unit individual allocation information 620.

For example, the 1-bit 242-tone resource unit individual allocation information 620 having the value of '0' may indicate the allocation of 1 242-tone resource unit to the STA.

For example, the 1-bit 242-tone resource unit individual allocation information 620 having the value of '1' may indicate the allocation of 2 242-tone resource units to the STA. The allocation of 2 242-tone resource units to 1 STA may indicate a SU-based transmission within the 40 MHz bandwidth. If the number of 26-tone resource units that can be allocated within the 40 MHz bandwidth is equal to 19, and if the 242-tone resource unit individual allocation information 620 indicates the allocation of 2 242-tone resource units to the STA, the STA may be additionally allocated with 1 26-tone resource unit.

In case the STA is allocated with 2 242-tone resource units, interleaving on 234 data tones being included in the 242 tones may be performed by using an interleaver for 242-tone resource units (234-size interleaver). In case the STA is allocated with 2 242-tone resource units and 1 26-tone resource units, interleaving based on an interleaver for 242-tone resource units (234-size interleaver) and an interleaver for 26-tone resource units (24-size interleaver) may be performed.

Additionally, n bits (e.g., 2 bits) may be allocated as information on the allocation of 26-tone resource units to individual STAs (hereinafter referred to as 26-tone resource unit individual allocation information 640) within a 40 MHz bandwidth. The 2-bit 26-tone resource unit individual allocation information 640 may notify information on the 242-tone resource units that are allocated to individual STAs. In case the 242-tone resource unit total allocation information 600 indicates the allocation of 2 242-tone resource units within the 40 MHz bandwidth, allocation of the 26-tone resource units to individual STAs may not be performed. In this case, the 26-tone resource unit individual allocation information 640 may be used as another type of information. Alternatively, in case the allocation of 2 242-tone resource units within the 40 MHz bandwidth is indicated, the STA may not perform decoding on the 26-tone resource unit individual allocation information 640.

For example, the 2-bit 26-tone resource unit individual allocation information 640 having the value of '00' may indicate the allocation of 1 26-tone resource unit to the STA.

For example, the 2-bit 26-tone resource unit individual allocation information 640 having the value of '01' may indicate the allocation of 2 26-tone resource units to the STA.

For example, the 2-bit 26-tone resource unit individual allocation information 640 having the value of '10' may indicate the allocation of 3 26-tone resource units to the STA.

For example, the 2-bit 26-tone resource unit individual allocation information 640 having the value of '11' may indicate the allocation of 4 26-tone resource units to the STA.

Such allocation of the 26-tone resource units and the 242-tone resource units may be performed via resource unit allocation signaling/signaling indication that is based on the 26-tone resource unit individual allocation information 640 and 242-tone resource unit individual allocation information 620.

According to the exemplary embodiment of the present invention, a minimum of 1 STA and a maximum of 19 STAs may be supported within the 40 MHz bandwidth based on the 242-tone resource units and the 26-tone resource units. The STA may be operated within the 40 MHz bandwidth by being allocated with 1 or 2 242-tone resource unit(s) or 1, 2, 3, or 4 26-tone resource unit(s).

For example, the communication of a minimum of 1 STA may be supported based on the allocation of 2 242-tone resource units to 1 STA (or SU-based transmission) within the 40 MHz bandwidth. Alternatively, each of the 2 242-tone resource units may be respectively allocated to each of 2 STAs within the 40 MHz bandwidth. Alternatively, 1 242-tone resource unit may be allocated to 1 STA, and the remaining 9 or 10 26-tone resource units may be allocated to 2 STAs within the 40 MHz bandwidth. The communication of a maximum of 19 STAs may be supported based on the allocation of each of 19 26-tone resource units to each of 19 STAs within the 40 MHz bandwidth.

Figure 7:
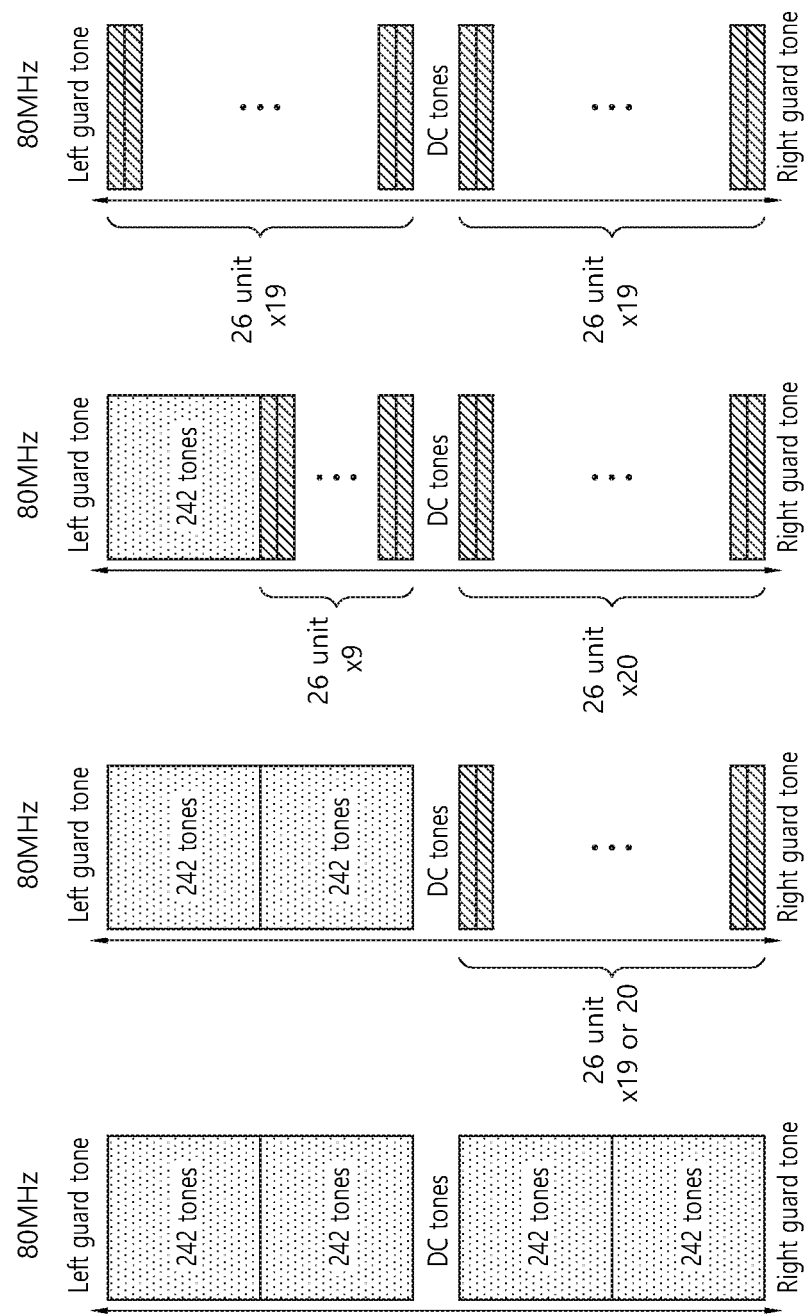
FIG. 7 is a conceptual view illustrating an allocation of resource units within an 80 MHz bandwidth according to an exemplary embodiment of the present invention.

FIG. 7 is a conceptual view illustrating an allocation of resource units within an 80 MHz bandwidth according to an exemplary embodiment of the present invention.

FIG. 7 discloses the allocation of 242-tone resource units/26-tone resource units within an 80 MHz bandwidth.

Referring to a first drawing from a left side of FIG. 7, four 242-tone resource units may be allocated to the available tones within the 80 MHz bandwidth. Four 242-tone resource units may be allocated to one STA within the 80 MHz bandwidth. Four 242-tone resource units may be allocated to one STA within the 80 MHz bandwidth for a SU based transmission. In case a MU OFDMA transmission is not performed, and in case resources for a plurality of STAs are multiplexed and allocated to four 242-tone resource units for MU-MIMO transmission, separate resource allocation information may not be included in a header of a PPDU. In this case, information on the number of STAs being allocated for MU-MIMO may be included in the header of a PPDU. In case four 242-tone resource units are allocated to one STA within the 80 MHz bandwidth, separate resource allocation information may not be included in a header of a PPDU. An STA may know that all of the four 242-tone resource unit have been allocated within the 80 MHz bandwidth based only on information on the size of the entire bandwidth (e.g., 40 MHz) and information on an STA being allocated within the entire bandwidth (information indicating that only the STA has been allocated within the entire bandwidth).

Alternatively, a resource unit including two 242-tone resource units may be separately allocated to each of the two STAs within the 80 MHz bandwidth. More specifically, two 242-tone resource units may be allocated to STA1, and two 242-tone resource units may be allocated to STA2. The 26-tone resource unit may not be used for the allocation of resource units. As described above, two STAs may be respectively allocated with a resource unit including two 242-tone resource units based on a sequential resource unit allocation signaling within the PPDU header.

Referring to a second drawing from the left side of FIG. 7, each of two 242-tone resource units is respectively allocated to each of the STAs, and each of the plurality of 26-tone resource units being allocated to the remaining available tones may be allocated to other plurality of STAs.

In case the number of available tones within the 80 MHz bandwidth is equal to 1000 tones (a 1000-tone plan) 19 26-tone resource units may be allocated to the remaining available tones. In this case, a maximum of 19 STAs may be serviced by being allocated with the 19 26-tone resource units.

In case the number of available tones within the 80 MHz bandwidth is equal to 1008 tones (a 1008-tone plan) 20 26-tone resource units may be allocated to the remaining available tones. In this case, a maximum of 20 STAs may be serviced by being allocated with the 20 26-tone resource units.

Referring to a third drawing from the left side of FIG. 7, one 242-tone resource unit may be allocated to one STA within the 80 MHz bandwidth, and each of the plurality of 26-tone resource units being allocated to the remaining available tones may be allocated to other plurality of STAs. 29 26-tone resource units may be allocated to the remaining available tones excluding the one 242-tone resource unit, and each of the 29 26-tone resource units may be allocated to each of a maximum of 29 STAs.

Referring to a fourth drawing from the left side of FIG. 7, resource allocation that is based only on 26-tone resource units without any 242-tone resource units may be performed within the 80 MHz bandwidth. In this case, 38 26-tone resource units may be allocated within the 80 MHz bandwidth, and each of the 38 26-tone resource units may be allocated to each of a maximum of 38 STAs.

Figure 8:
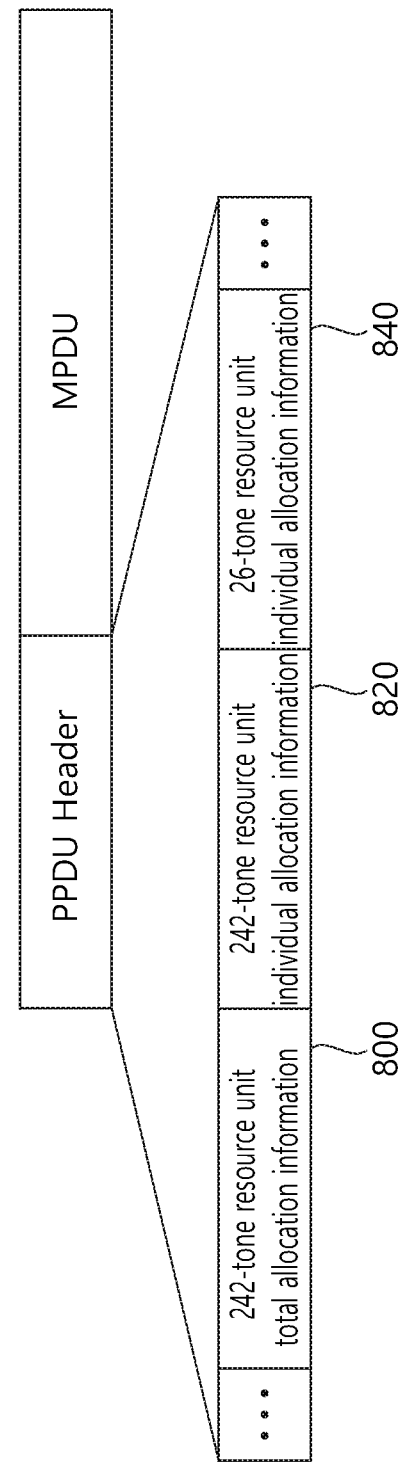
FIG. 8 is a conceptual view illustrating a method for signaling resource unit allocation information according to the exemplary embodiment of the present invention.

FIG. 8 is a conceptual view illustrating a method for signaling resource unit allocation information according to the exemplary embodiment of the present invention.

Referring to FIG. 8, n bits (e.g., 4 bits) may be allocated as information on the allocation of 242-tone resource units (hereinafter referred to as 242-tone resource unit total allocation information 800) within an 80 MHz bandwidth. The 242-tone resource unit total allocation information 800 may notify information on the 242-tone resource units that are allocated within the 80 MHz bandwidth.

Each of the 4 bits corresponding to the 242-tone resource unit total allocation information 800 may respectively indicate each of the 4 242-tone resource units that can be allocated within the 80 MHz bandwidth. For example, starting from the left-side leftover tone to the right-side leftover tone, the 4 242-tone resource units may be sequentially expressed as a first 242-tone resource unit, a second 242-tone resource unit, a third 242-tone resource unit, and a fourth 242-tone resource unit. More specifically, each of the 4 bits corresponding to the 242-tone resource unit total allocation information may respectively indicate each of the first 242-tone resource unit, the second 242-tone resource unit, the third 242-tone resource unit, and the fourth 242-tone resource unit.

More specifically, whether or not each of the first 242-tone resource unit to the fourth 242-tone resource unit is allocated within the 80 MHz bandwidth may be indicated based on a 4-bit signaling (or 4-bit bitmap) from '0000' to '1111'.

In case the 4-bit 242-tone resource unit total allocation information 800 is equal to '1111', this may indicate that the SU-based transmission may be performed within the 80 MHz bandwidth, and, in case the 4-bit 242-tone resource unit total allocation information 800 is equal to the remaining values, this may indicate MU-based transmission within the 80 MHz bandwidth.

Additionally, n bits (e.g., 2 bits) may be allocated as information on the allocation of 242-tone resource units to individual STAs (hereinafter referred to as 242-tone resource unit individual allocation information 820) within an 80 MHz bandwidth. The 2-bit 242-tone resource unit individual allocation information 820 may include information on a number of 242-tone resource units that are allocated to individual STAs. In case the 242-tone resource unit total allocation information 800 indicates the allocation of 0 242-tone resource units within the 80 MHz bandwidth, allocation of the 242-tone resource units to individual STAs may not be performed. In this case, the 242-tone resource unit individual allocation information 820 may be used as another type of information. Alternatively, in case the 242-tone resource unit total allocation information 800 indicates the allocation of 0 242-tone resource units within the 80 MHz bandwidth, the STA may not perform decoding on the 242-tone resource unit individual allocation information 820.

For example, the 2-bit 242-tone resource unit individual allocation information 820 having the value of '00' may indicate the allocation of 1 242-tone resource unit to the STA.

For example, the 2-bit 242-tone resource unit individual allocation information 820 having the value of '01' may indicate the allocation of 2 242-tone resource units to the STA. In case the number of 26-tone resource units being allocated within the 80 MHz bandwidth is equal to 38, the 2-bit 242-tone resource unit individual allocation information 820 having the value of '01' may also indicate the allocation of 2 242-tone resource units and 1 26-tone resource unit. In this case, as described above, an interleaver for the 242-tone resource units and an interleaver for the 26-tone resource units may be individually applied to each of the 242-tone resource units and the 26-tone resource units.

For example, the 2-bit 242-tone resource unit individual allocation information 820 having the value of '10' may indicate the allocation of 3 242-tone resource unit to the STA.

For example, the 2-bit 242-tone resource unit individual allocation information 820 having the value of '11' may indicate the allocation of 4 242-tone resource units to the STA. In case the number of 26-tone resource units being allocated within the 80 MHz bandwidth is equal to 38, the 2-bit 242-tone resource unit individual allocation information 820 having the value of '11' may also indicate the allocation of 4 242-tone resource units and 2 26-tone resource units. In this case, as described above, an interleaver for the 242-tone resource units and an interleaver for the 26-tone resource units may be individually applied to each of the 242-tone resource units and the 26-tone resource units.

Additionally, n bits (e.g., 2 bits) may be allocated as information on the allocation of 26-tone resource units to individual STAs (hereinafter referred to as 26-tone resource unit individual allocation information 840) within an 80 MHz bandwidth. The 2-bit 26-tone resource unit individual allocation information 840 may notify information on the 242-tone resource units that are allocated to individual STAs. In case the 242-tone resource unit total allocation information 800 indicates the allocation of 4 242-tone resource units within the 80 MHz bandwidth, allocation of the 26-tone resource units to individual STAs may not be performed. In this case, the 26-tone resource unit individual allocation information 840 may be used as another type of information. Alternatively, in case the allocation of 4 242-tone resource units within the 80 MHz bandwidth is indicated, the STA may not perform decoding on the 26-tone resource unit individual allocation information 640.

For example, the 2-bit 26-tone resource unit individual allocation information 840 having the value of '00' may indicate the allocation of 1 26-tone resource unit to the STA.

For example, the 2-bit 26-tone resource unit individual allocation information 840 having the value of '01' may indicate the allocation of 2 26-tone resource units to the STA.

For example, the 2-bit 26-tone resource unit individual allocation information 840 having the value of '10' may indicate the allocation of 3 26-tone resource units to the STA.

For example, the 2-bit 26-tone resource unit individual allocation information 840 having the value of '11' may indicate the allocation of 4 26-tone resource units to the STA.

Such allocation of the 26-tone resource units and the 242-tone resource units may be performed via resource unit allocation signaling/signaling indication that is based on the 26-tone resource unit individual allocation information 840 and 242-tone resource unit individual allocation information 820.

According to the exemplary embodiment of the present invention, a minimum of 1 STA and a maximum of 38 STAs may be supported within the 80 MHz bandwidth based on the 242-tone resource units and the 26-tone resource units.

The STA may be operated within the 80 MHz bandwidth by being allocated with 1 or 2 242-tone resource unit(s) or 1, 2, 3, or 4 26-tone resource unit(s).

For example, the communication of a minimum of 1 STA may be supported based on the allocation of 4 242-tone resource units to 1 STA (or SU-based transmission) within the 80 MHz bandwidth. Each of the 2 242-tone resource units may be respectively allocated to each of 2 STAs within the 80 MHz bandwidth. 2 242-tone resource units may be allocated to 1 STA, and the remaining 2 242-tone resource units may each be allocated to each of 2 STAs within the 80 MHz bandwidth. The communication of a maximum of 38 STAs may be supported based on the allocation of each of 38 26-tone resource units to each of 38 STAs within the 80 MHz bandwidth.

Figure 9:
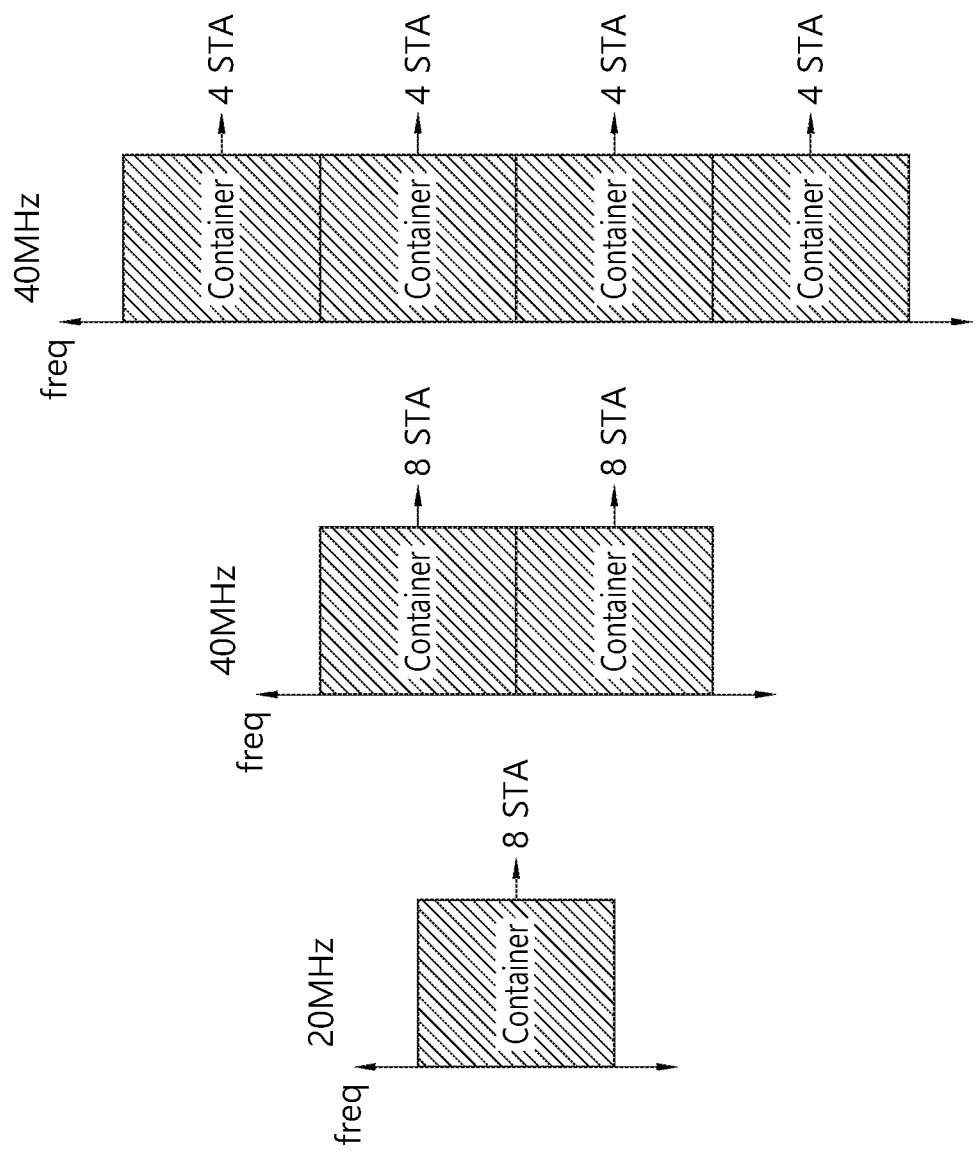
FIG. 9 is a conceptual view illustrating resource allocation based on a container according to an exemplary embodiment of the present invention.

FIG. 9 is a conceptual view illustrating resource allocation based on a container according to an exemplary embodiment of the present invention.

In case the number of STAs increases, overhead for the signaling of resource allocation may also increase. Therefore, according to the exemplary embodiment of the present invention, a container for resource allocation to the STA may be defined, and resource allocation based on the container may be performed.

FIG. 9 discloses a container for performing resource allocation to the STA.

Referring to FIG. 9, one container may correspond to one 242-tone resource unit or may correspond to a plurality of 26-tone resource units. The container may further include additional leftover tones and may also include 13-tone divided resource units, which are configured by dividing 26-tone resource units. For example, the container may correspond to a resource unit of 26*9+13=247 tones including 9 26-tone resource units and 1 13-tone divided resource unit.

More specifically, a container may correspond to a resource unit that is defined for signaling information on resource allocation. A resource unit that can be allocated for each container may be configured, and a number of STAs that can be allocated for each container may be restricted. The number of containers that can be allocated for each bandwidth may be as described below.

One container may be allocated for the 20 MHz bandwidth, two containers may be allocated for the 40 MHz bandwidth, and four containers may be allocated for the 80 MHz bandwidth.

The number of STAs that can be allocated for a container may be restricted in accordance to each bandwidth. For example, 8 STAs (or 9 STAs) may be allocated for a container corresponding to the 20 MHz bandwidth. 8 STAs (or 9 STAs) may be allocated for a container corresponding to the 40 MHz bandwidth, and a total of 16 STAs (or 18 STAs) may be allocated for 2 containers. 4 STAs (or 5 STAs) may be allocated for a container corresponding to the 80 MHz bandwidth, and a total of 16 STAs (or 20 STAs) may be allocated for 4 containers.

Figure 10:
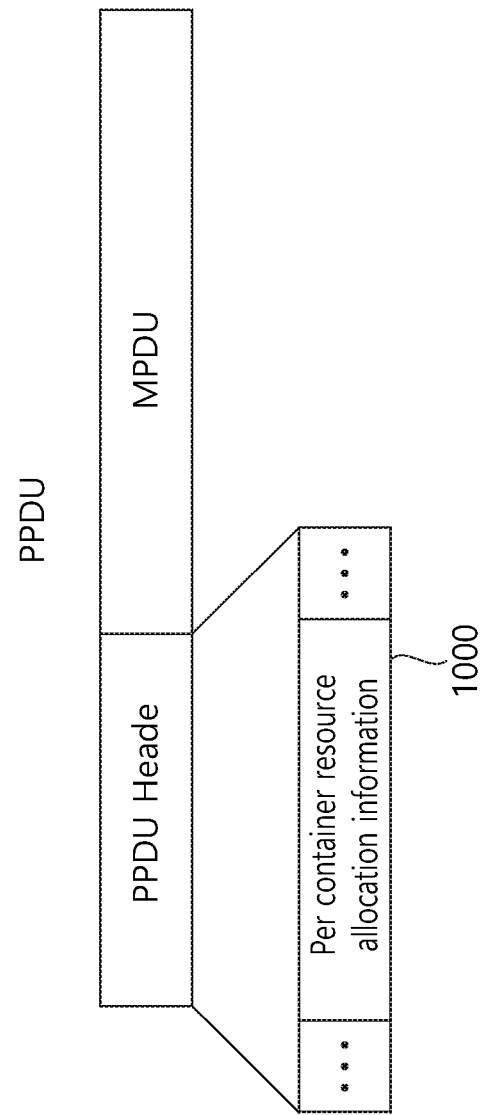
FIG. 10 is a conceptual view illustrating per container resource allocation information (or resource allocation information for each container) according to the exemplary embodiment of the present invention.

FIG. 10 is a conceptual view illustrating per container resource allocation information (or resource allocation information for each container) according to the exemplary embodiment of the present invention.

Referring to FIG. 10, n bits (e.g., 2 bits or 3 bits) may be defined as per container resource allocation information (per container resource allocation bits) 1000, which may notify a number of users being allocated for each container (i.e., per container) (or a number of tone units for resource allocation differentiated by frequency division multiplexing (FDM)). 2-bit per container resource allocation information 1000 may indicate resource allocation for a maximum of 4 STAs, and 3-bit per container resource allocation information 1000 may indicate resource allocation for a maximum of 8 STAs.

For example, in case the per container resource allocation information 1000 is equal to '000', allocation of 1 STA to a container may be indicated. For example, one STA may be allocated with a 242-tone resource unit, which corresponds to a container.

For example, in case the per container resource allocation information 1000 is equal to '001', allocation of 2 STAs to a container may be indicated. For example, a container may correspond to 8 26-tone resource units, and 4 26-tone resource units may be allocated to each of the 2 STAs.

For example, in case the per container resource allocation information 1000 is equal to '010', allocation of 3 STAs to a container may be indicated. For example, a container may correspond to 9 26-tone resource units, and 3 26-tone resource units may be allocated to each of the 3 STAs.

For example, in case the per container resource allocation information 1000 is equal to '011', allocation of 4 STAs to a container may be indicated. For example, a container may correspond to 8 26-tone resource units, and 2 26-tone resource units may be allocated to each of the 4 STAs. A container may correspond to 9 26-tone resource units, and 2 26-tone resource units may be allocated to each of 3 STAs, and 3 26-tone resource units may be allocated to 1 STA.

For example, in case the per container resource allocation information 1000 is equal to '111', allocation of 8 STAs to a container may be indicated. For example, a container may correspond to 8 26-tone resource units, and 1 26-tone resource unit may be allocated to each of the 8 STAs. A container may correspond to 9 26-tone resource units, and 1 26-tone resource unit may be allocated to each of 7 STAs, and 2 26-tone resource units may be allocated to 1 STA.

Figure 11:
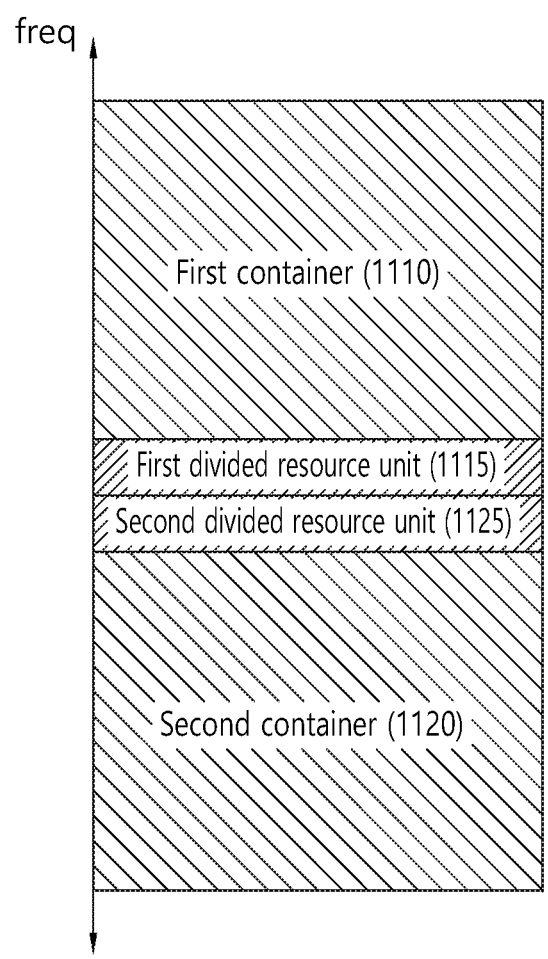
FIG. 11 is a conceptual view illustrating resource allocation based on a container according to an exemplary embodiment of the present invention.

FIG. 11 is a conceptual view illustrating resource allocation based on a container according to an exemplary embodiment of the present invention.

FIG. 11 discloses a resource allocation method that is based on a logical association of divided resource units each being included in a plurality of containers.

If a 13-tone divided resource unit, which is configured by dividing a 26-tone resource unit, is included in a specific container, the corresponding 13-tone divided resource unit may be logically associated with another 13-tone divided resource unit, which is included in another container, so as to be used as one 26-tone resource unit.

For example, in case a first 13-tone divided resource unit 1115 is allocated to a first container 1110, and a second 13-tone divided resource unit 1125 is allocated to a second container 1120, signaling for the allocation of a resource unit, which is configured by associating (or combining) the first divided resource unit 1115 and the second divided resource unit 1125, may be performed.

The first divided resource unit 1115 included in the first container 1110 and the second divided resource unit 1125 included in the second container 1120 may be allocated to the frequency axis so as to be physically connected to one another.

In case one 13-tone divided resource unit is included in one container, the 13-tone divided resource unit may be signaled by using the same method that is used for signaling a 26-tone resource unit. For example, in case 9 26-tone resource units are included in one container, and in case one 13-unit divided resource unit is also included in the corresponding container, in order perform signaling on the 13-tone divided resource unit, the same signaling method that is performed for signaling 10 26-tone resource units may be performed. In other words, signaling on the resource allocation may be performed by assuming one 13-unit divided resource unit as one 26-tone resource unit.

In case the first 13-tone divided resource unit included in the first container is allocated, the first 13-tone divided resource unit included in the first container may be allocated along with the second 13-tone divided resource unit included in the second container, the second 13-tone divided resource unit being logically mapped to the first 13-tone divided resource unit. The first 13-tone divided resource unit and the second 13-tone divided resource unit may be logically associated with one another so as to be allocated to the STA as one 26-tone resource unit. The second container may correspond to a container that is adjacent to the first container. The second divided resource unit may correspond to a divided resource unit that is adjacent to the first divided resource unit.

In case another divided resource unit that is logically mapped to the 13-tone divided resource unit is already used, allocation of the 9 26-tone resource units excluding the 13-tone divided resource unit may be performed. In other words, in case another divided resource unit that is logically mapped to the 13-tone divided resource unit is already used resource allocation may be performed under the assumption that only 9 26-tone resource units exist in the container.

According to the exemplary embodiment of the present invention, depending upon the usage or non-usage of the 13-tone divided resource that is included in the container, the per container resource allocation information may be interpreted differently.

For example, in case the per container resource allocation information is equal to '000', allocation of 1 STA to a container may be indicated. For example, one STA may be allocated with a 242-tone resource unit, which corresponds to a container.

For example, in case the per container resource allocation information is equal to '001', allocation of 2 STAs to a container may be indicated. For example, a container may correspond to 8 26-tone resource units, and 4 26-tone resource units may be allocated to each of the 2 STAs.

For example, in case the per container resource allocation information is equal to '010', allocation of 3 STAs to a container may be indicated.

In case the 13-tone divided resource unit is not used, the container may correspond to 9 26-tone resource units, and 3 26-tone resource units may be allocated to each of the 3 STAs.

In case the 13-tone divided resource unit is used, the container may correspond to 9 26-tone resource units and 1 13-tone divided resource unit, and 3 26-tone resource units may be allocated to each of the 2 STAs, and 4 26-tone resource units may be allocated to the remaining 1 STA. At this point, among the 4 26-tone resource units, 1 26-tone resource unit may be allocated based on an association of the 13-tone divided resource unit included in the container and another 13-tone divided resource unit included in another container.

For example, in case the per container resource allocation information is equal to '011', allocation of 4 STAs to a container may be indicated.

More specifically, in case the 13-tone divided resource unit is not used, the container may correspond to 9 26-tone resource units, and each of the 4 STAs may be respectively allocated with 2 26-tone resource units, 2 26-tone resource units, 3 26-tone resource units, and 2 26-tone resource units.

In case the 13-tone divided resource unit is used, the container may correspond to 9 26-tone resource units and 1

13-tone divided resource unit, and each of the 4 STAs may be respectively allocated with 2 26-tone resource units, 2 26-tone resource units, 3 26-tone resource units, and 3 26-tone resource units. At this point, among the 3 26-tone resource units, 1 26-tone resource unit may be allocated based on an association of the 13-tone divided resource unit included in the container and another 13-tone divided resource unit included in another container.

For example, in case the per container resource allocation information is equal to '111', allocation of 8 STAs to a container may be indicated.

More specifically, in case the 13-tone divided resource unit is not used, the container may correspond to 9 26-tone resource units, and 1 26-tone resource unit may be allocated to each of 7 STAs, and 2 26-tone resource units may be allocated to 1 STA.

In case the 13-tone divided resource unit is used, the container may correspond to 9 26-tone resource units and 1 13-tone divided resource unit, and each of the 6 STAs may be allocated with 1 26-tone resource unit, and each of the 2 STAs may be allocated with 2 26-tone resource units. At this point, among the 2 26-tone resource units, 1 26-tone resource unit may be allocated based on an association of the 13-tone divided resource unit included in the container and another 13-tone divided resource unit included in another container.

Based on the above-described per container resource allocation information, the usage or non-usage of a 13-tone divided resource unit that is to be logically grouped for each container may be indicated. Alternatively, information on the resource allocation that is based on the association of 13-tone divided resource units may be additionally added to the PPDU and may then be transmitted.

In case a container is defined, the number of STAs that are to be allocated to the container and the number of resource units that are to allocated to each STA may be determined based on the per container resource allocation information. In case the number of STAs that are to be allocated to the container and the number of resource units that are to be allocated to each STA are determined, each of the STAs may be sequentially allocated with resource units within the frequency axis by using the same method as the resource allocation method that is based on resource unit allocation signaling.

Alternatively, in case a container is defined, the number of STAs that are to be allocated to the container may be determined based on the per container resource allocation information. The number of resource units that are allocated for each STA within the container may be determined in accordance with the number of STAs that are to be allocated to the container. In case the number of STAs that are to be allocated to the container and the number of resource units that are to be allocated to each STA are determined, each of the STAs may be sequentially allocated with resource units within the frequency axis by using the same method as the resource allocation method that is based on resource unit allocation signaling.

Figure 12:
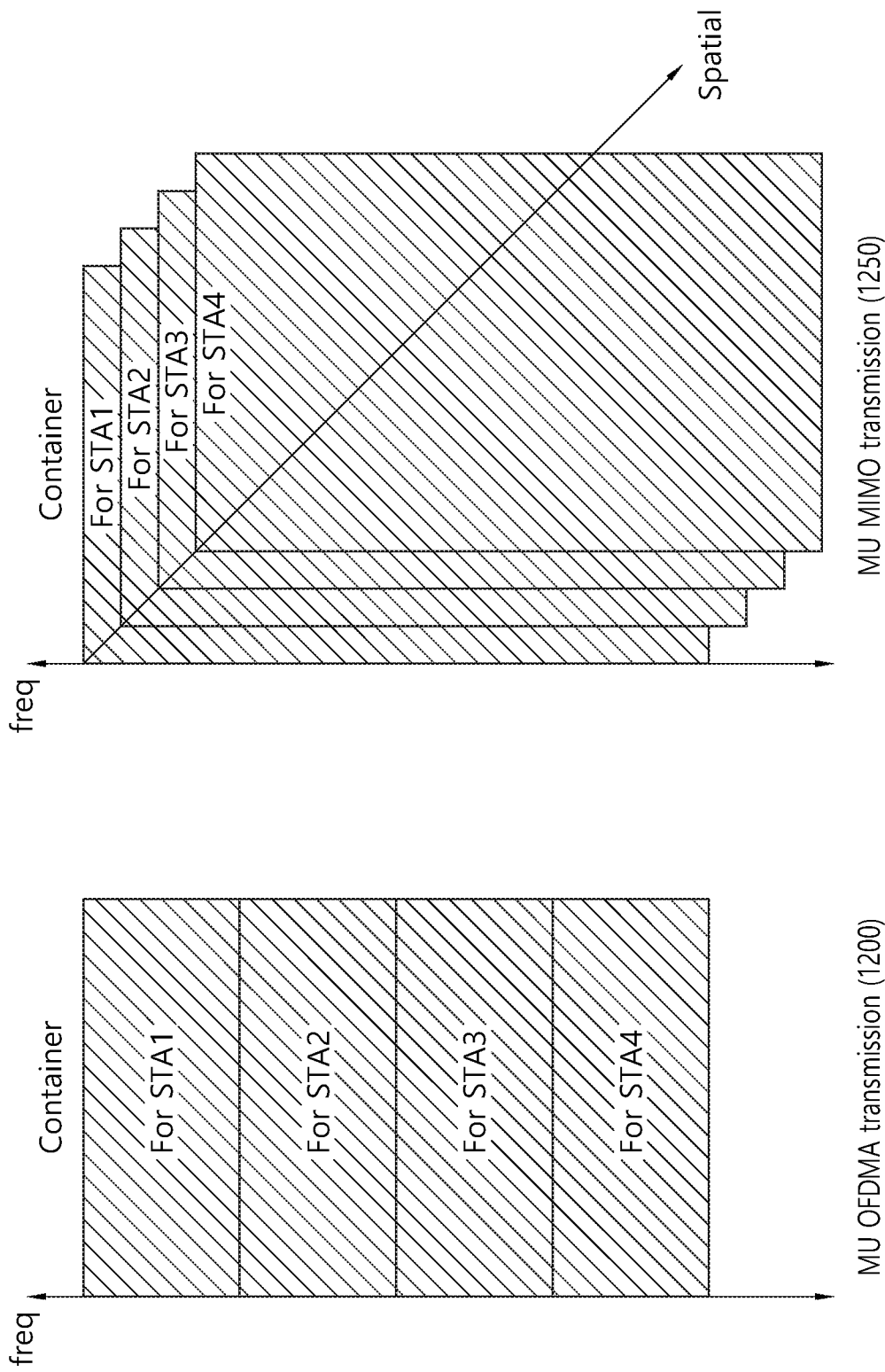
FIG. 12 is a conceptual view illustrating resource allocation based on a container according to an exemplary embodiment of the present invention.

FIG. 12 is a conceptual view illustrating resource allocation based on a container according to an exemplary embodiment of the present invention.

FIG. 12 discloses a container for resource allocation to STAs. MU OFDMA transmission/MU MIMO transmission that is/are based on the container is/are disclosed herein.

In case both the MU OFDMA transmission and the MU MIMO transmission are used, multiplexing may be performed not only within the frequency domain but also in the spatial domain, thereby enabling transmission of multiple STAs to be performed. More specifically, the same frequency resource may be divided within the spatial domain, thereby enabling transmission of multiple STAs to be performed within the divided spatial domain.

Referring to FIG. 12, the performance or non-performance of the MU OFDMA transmission 1200 and the MU MIMO transmission 1250 to the container may be indicated for each container.

For example, whether resources corresponding to a container correspond to resources for the MU OFDMA transmission 1200 or resources for the MU MIMO transmission 1250 may be indicated based on n bits. For example, information on whether the MU OFDMA transmission 1200 is being performed or whether MU MIMO transmission 1250 is being performed may be indicated through resources corresponding to a specific container based on 1 bit.

As another example, bits indicating whether or not the MU OFDMA transmission 1200 is performed within the specific container and bits indicating whether or not the MU MIMO transmission 1250 is performed within the specific container may be individually defined.

Whether the MU OFDMA transmission 1200 is performed, or whether the MU MIMO transmission 1250 is performed, the maximum number of STAs that can be allocated within the container may be equal to one another. For example, the maximum number of STAs in a case when both the MU OFDMA transmission 1200 and the MU MIMO transmission 1250 are performed within the container may be equal to the number of STAs corresponding to the case when the MU OFDMA transmission 1200 and the MU MIMO transmission 1250 are performed separately.

For example, 8 STAs for each container corresponding to the 20 MHz bandwidth may be defined as the maximum number of STAs. 8 STAs for each container corresponding to the 40 MHz bandwidth may be defined as the maximum number of STAs, and a total of 16 STAs may be allocated within 2 containers corresponding to the 40 MHz bandwidth. 4 STAs for each container corresponding to the 80 MHz bandwidth may be defined as the maximum number of STAs, and a total of 16 STAs may be allocated within 4 containers corresponding to the 80 MHz bandwidth.

Figure 13:
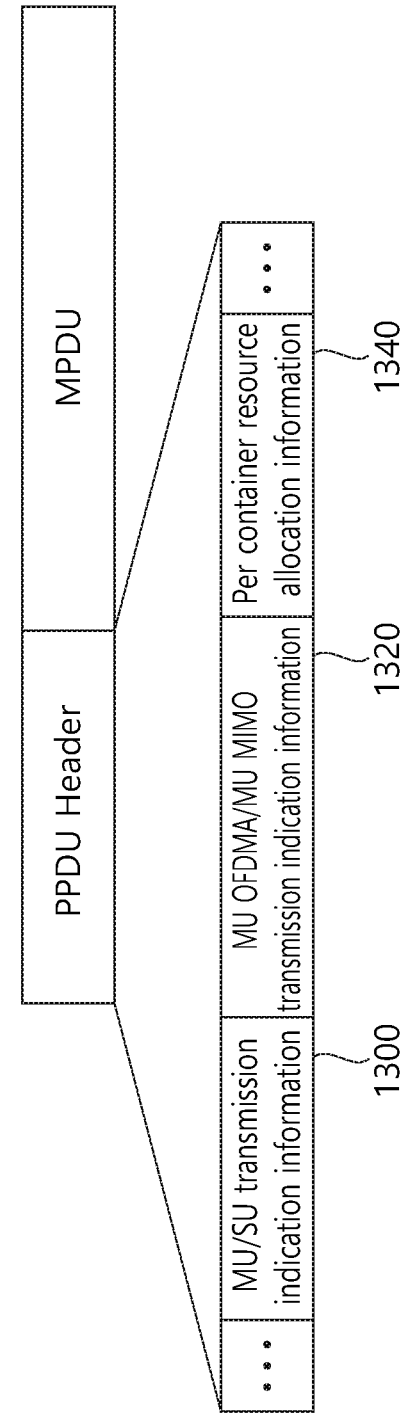
FIG. 13 is a conceptual view illustrating resource allocation based on a container according to an exemplary embodiment of the present invention.

FIG. 13 is a conceptual view illustrating resource allocation based on a container according to an exemplary embodiment of the present invention.

FIG. 13 discloses a method for supporting MU MIMO transmission within a container. The MU MIMO transmission may be applied to diverse resource units being included in the container. Most particularly, FIG. 13 discloses a case when the MU MIMO transmission is applied to a largest resource unit that can be included in the container, which corresponds to a 242-tone resource unit.

For example, the MU MIMO transmission may be applied to the largest resource unit (e.g., 242-tone resource unit) that can be included in the container. In case of an SU-based transmission, the MU MIMO transmission may be performed based on a numerology for the SU-based transmission. Hereinafter, although the 242-tone resource unit is assumed as the largest resource unit that can be included in the container, a resource unit having a size other than 242 tones may also be defined as the largest resource unit that can be included in the container.

Firstly, whether SU-based transmission is being performed or whether MU-based transmission is being performed within the entire bandwidth may be indicated through n-bit MU/SU transmission indication information (MU/SU transmission indication bits) 1300.

For example, in case the SU-based transmission is performed within the entire bandwidth, the value of the 1-bit MU/SU transmission indication information 1300 may be equal to 1. And, in case the MU-based transmission is performed within the entire (or total) bandwidth, the value of 1-bit the MU/SU transmission indication information 1300 may be equal to 0. In case the total bandwidth (or entire bandwidth) corresponds to a 20 MHz bandwidth, the MU/SU transmission indication information 1300 may not be used.

In case the MU/SU transmission indication information 1300 indicates the MU-based transmission, the performance of the MU OFDMA transmission/MU MIMO transmission for each container (or per container) may be indicated through n-bit MU OFDMA/MU MIMO transmission indication information (MU OFDMA/MU MIMO transmission indication bits) 1320. For example, information on whether MU OFDMA transmission is performed or whether MU MIMO transmission is performed for each container may be indicated through the 1-bit MU OFDMA/MU MIMO transmission indication information 1320.

In case the MU/SU transmission indication information 1300 indicates the MU-based transmission, the number of allocated STAs per container may be defined by using the above-described n-bit per container resource allocation information 1340 for each container. For example, the number of allocated STAs per container may be defined by using 2-3-bit per container resource allocation information 1340. In case the MU OFDMA/MU MIMO transmission indication information 1320 indicates the MU MIMO transmission within the container, since the MU MIMO transmission is applied to the largest resource unit (e.g., 242-tone resource unit) that can be included in the container, the n-bit per container resource allocation information 1340 may indicate the number of STAs that are to perform communication via MU MIMO based transmission allocated to the 242-tone resource unit.

In case the MU/SU transmission indication information 1300 indicates the SU-based transmission, the number of STAs for the MU MIMO transmission may be signaled based on the numerology of the SU-based transmission.

Figure 14:
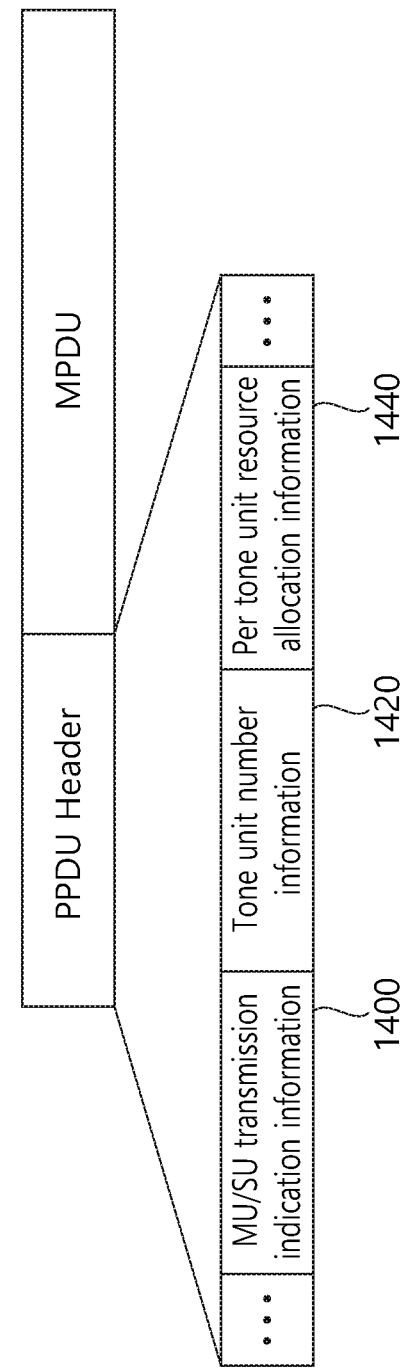
FIG. 14 is a conceptual view illustrating resource allocation based on a container according to an exemplary embodiment of the present invention.

FIG. 14 is a conceptual view illustrating resource allocation based on a container according to an exemplary embodiment of the present invention.

FIG. 14 discloses a method for supporting MU MIMO transmission within a container. Most particularly, FIG. 14 discloses a method for supporting MU MIMO transmission based on tone units.

Referring to FIG. 14, the MU MIMO transmission may be applied to diverse resource units being included in the container. The MU MIMO transmission may be performed based on diverse resource unit sizes that can be included in the container. For example, the MU MIMO transmission may be performed in 1 26-tone resource unit, 2 26-tone resource units, 3 26-tone resource units, 4 26-tone resource units, or a 242-tone resource unit.

The number of tone units that can be allocated per container in order to support the MU MIMO transmission within the container may be defined. For example, one container may include 9 26-tone resource units, and 3 sets of 3 26-tone resource units may be allocated within one container. 3 26-tone resource units configure one 26-tone resource unit group, and 3 26-tone resource unit groups may be allocated within the container. In this case, the number of tone units being allocated to the container may be equal to 3. A tone unit may correspond to a divided resource unit for the MU MIMO transmission within one container.

Hereinafter, a resource allocation method for the MU MIMO transmission that is based on tone units is disclosed.

Firstly, whether SU-based transmission is being performed or whether MU-based transmission is being performed within the entire bandwidth may be indicated through n-bit MU/SU transmission indication information 1400.

For example, in case the SU-based transmission is performed within the entire bandwidth, the value of the 1-bit MU/SU transmission indication information 1400 may be equal to 1. And, in case the MU-based transmission is performed within the entire (or total) bandwidth, the value of 1-bit the MU/SU transmission indication information 1400 may be equal to 0. In case the total bandwidth corresponds to a 20 MHz bandwidth, the MU/SU transmission indication information 1400 may not be used.

In case the MU/SU transmission indication information 1400 indicates the MU-based transmission, the number of tone units for each container may be indicated based on n bits. Information (or bits) indicating the number of tone units for each container may also be expressed by using the term tone unit number information (or tone unit number information bits) 1420. In other words, the tone unit number information 1420 may include information on a number of tone units for resource allocation corresponding to MU MIMO transmission differentiated by frequency division multiplexing (FDM). For example, 2 or 3-bit tone unit number information 1420 may indicate the number of tone units being included in one container.

Additionally, in case the MU/SU transmission indication information 1400 indicates the MU-based transmission, a number of STAs that are to perform communication via MU MIMO based transmission allocated to each of the tone units may be indicated based on the n-bit per tone unit resource allocation information 1440.

For example, a plurality of tone units may be included in one container, and each set of n-bit per tone unit resource allocation information 1440 may indicate a number of STAs that are to perform communication via MU MIMO based transmission allocated to each of the plurality of tone units.

In case the MU/SU transmission indication information 1400 indicates the SU-based transmission, the number of STAs for the MU MIMO transmission may be signaled based on the numerology of the SU-based transmission.

According to the exemplary embodiment of the present invention, a case when the number of tone units that can be allocated per container is equal to n and when the maximum number of STAs that can be allocated per container is equal to x may be assumed. In this case, Flooring(x/n) bits (or min (Flooring(x/n), m) bits) or Ceiling (x/n) bits (or min(Ceiling (x/n), m) bits) are defined as per tone unit resource allocation (x/n) bits for each tone unit, and the per tone unit resource allocation bits may indicate the number of STAs that are to perform communication based on MU MIMO transmission in individual tone units.

According to the exemplary embodiment of the present invention, the maximum number of STAs performing MU MIMO transmission (hereinafter referred to as a maximum number of MU MIMO transmission STAs) that can be allocated in each tone unit may be defined for each tone unit size.

For example, in case the tone unit size corresponds to a 242-tone resource unit, the maximum number of MU MIMO transmission STAs may be configured to be equal to the maximum number of STAs that can be allocated per container. For example, in case the tone unit size corresponds to a 242-tone resource unit, the maximum number of MU MIMO transmission STAs may be equal to 4 in the 20 MHz bandwidth/40 MHz bandwidth and may be equal to 2 in the 80 MHz bandwidth.

In case the tone unit size corresponds to a 26-tone resource unit, the maximum number of MU MIMO transmission STAs may be equal to a maximum of 4 (20 MHz bandwidth/40 MHz bandwidth) or may be equal to 2 (80 MHz bandwidth).

In case the tone unit size corresponds to 2 26-tone resource units, the maximum number of MU MIMO transmission STAs may be equal to a maximum of 4 (20 MHz bandwidth/40 MHz bandwidth) or may be equal to 2 (80 MHz bandwidth).

In case the tone unit size corresponds to 3 26-tone resource units, the maximum number of MU MIMO transmission STAs may be equal to 4.

In case the tone unit size corresponds to 4 26-tone resource units, the maximum number of MU MIMO transmission STAs may be equal to 4.

According to another exemplary embodiment of the present invention, the maximum number of STAs performing—MU MIMO transmission (hereinafter referred to as a maximum number of MU MIMO transmission STAs) that can be allocated in each tone unit may be configured to have the same value regardless of the tone unit size. Alternatively, in case the tone unit size corresponds to a 242-tone resource unit, the maximum number of MU MIMO transmission STAs in the tone unit is equal to 8. And, in case the tone unit size is smaller than the 242-tone resource unit (n 26-tone resource units), the maximum number of MU MIMO transmission STAs in the tone unit is equal to 4.

In any case, the maximum number of MUMIMO transmission STAs that ate allocated to a tone unit may be configured to satisfy the maximum number of STAs that can be allocated for each container.

Although the above-described exemplary embodiment of the present invention has been described based on the 26-tone resource unit, the above-described resource allocation method may also be applied to other resource unit sizes other than 26 tones (e.g., 30-tone resource units).

For example, one container may be defined as one 242-tone resource unit or as 8 30-tone resource units.

In this case, the number of containers per bandwidth may be defined as 1 container for the 20 MHz bandwidth, 2 containers for the 40 MHz bandwidth, and 4 containers for the 80 MHz bandwidth.

Additionally, as the maximum number of STAs that can be allocated for each container, 8 STAs may be allocated for the 20 MHz bandwidth.

2 containers may be defined in the 40 MHz bandwidth, and 4 STAs may be allocated to each of the 2 containers. Therefore, a maximum of 8 STAs may be allocated within the 40 MHz bandwidth.

4 containers may be defined in the 80 MHz bandwidth, and 4 STAs may be allocated to each of the 4 containers. Therefore, a maximum of 16 STAs may be allocated within the 80 MHz bandwidth.

2 bits or 3 bits may be defined for each container as the per container resource allocation information, so as to notify the number of STAs being allocated for each container. The 2-bit per container resource allocation information may indicate resource allocation for a maximum of 4 STAs, and the 3-bit per container resource allocation information may indicate resource allocation for a maximum of 8 STAs.

For example, in case the per container resource allocation bit is equal to '000', allocation of 1 STA to a container may be indicated. For example, one STA may be allocated with a 242-tone resource unit, which corresponds to a container.

For example, in case the per container resource allocation bit is equal to '001', allocation of 2 STAs to a container may be indicated. For example, a container may correspond to 8 30-tone resource units, and 4 30-tone resource units may be allocated to each of the 2 STAs.

For example, in case the per container resource allocation bit is equal to '010', allocation of 3 STAs to a container may be indicated. For example, a container may correspond to 8 30-tone resource units, and 3 30-tone resource units may be allocated to each of the 2 STAs, and 2 30-tone resource units may be allocated to 1 STA.

For example, in case the per container resource allocation bit is equal to '011', allocation of 4 STAs to a container may be indicated. For example, a container may correspond to 8 30-tone resource units, and 2 30-tone resource units may be allocated to each of the 4 STAs.

For example, in case the per container resource allocation bit is equal to '111', allocation of 8 STAs to a container may be indicated. For example, a container may correspond to 8 30-tone resource units, and 1 30-tone resource unit may be allocated to each of the 8 STAs.

In case total bandwidth is equal to the 80 MHz bandwidth, the allocation of 17 30-tone resource unit may be performed. Accordingly, 4 30-tone resource units may be allocated to each of 4 containers, and one additional 30-tone resource unit may be used. The additional one 30-tone resource unit may be combined with another container (or other resource unit), thereby being automatically allocated.

According to the exemplary embodiment of the present invention, signaling for resource allocation that is based on 242-tone resource units and 26-tone resource units may be performed for each of a first resource unit group grouping at least one 242-tone resource unit (or first resource unit) and a second resource unit group grouping at least one 26-tone resource unit (or second resource unit). The above-described resource unit allocation signaling/signaling indication may be performed for each of the first resource unit group and the second resource unit group.

The first resource unit group that is allocated on the frequency axis may be first aligned in the logical domain, and, then, the second resource unit group may be allocated after the first resource unit group. The allocation of the second resource unit group on the frequency axis may be influenced by the allocation of the first resource unit group. For example, the second resource units being included in the second resource unit group may be allocated to bandwidths remaining from the frequency bandwidths after excluding the bandwidth, which is allocated for the first resource units being included in the first resource unit group, and the number and positions of the second resource units being included in the second resource unit group may be determined based on the number and positions of the first resource units being included in the first resource unit group.

Figure 15:
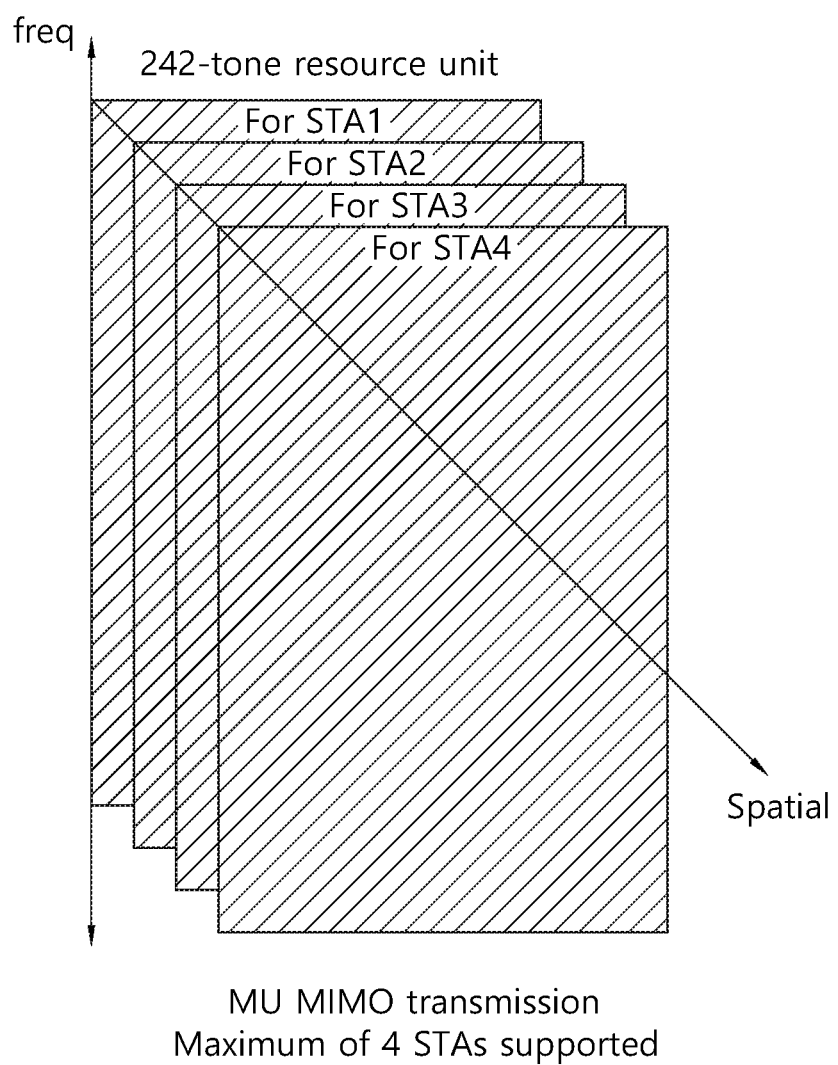
FIG. 15 is a conceptual view illustrating restriction in a number of STAs within a frequency bandwidth according to an exemplary embodiment of the present invention.

FIG. 15 is a conceptual view illustrating restriction in a number of STAs within a frequency bandwidth according to an exemplary embodiment of the present invention.

FIG. 15 discloses a restriction in the number of STAs performing MU OFDMA transmission/MU MIMO transmission.

Referring to FIG. 15, the MU MIMO transmission may be performed based on 242-tone resource units, and the number of STAs capable of performing MU MIMO transmission in the 242-tone resource unit may be restricted to a maximum of 4 STAs.

Although variations may occur in accordance with the OFDMA structure, the 20 MHz bandwidth may include 9 26-tone resource units, the 40 MHz bandwidth may include 18 26-tone resource units, and the 80 MHz bandwidth may include 37 26-tone resource units. At this point, in case the MU OFDMA transmission is performed in each bandwidth, MU OFDMA based communication of a maximum of 9 STAs may be performed for the 20 MHz bandwidth, MU OFDMA based communication of a maximum of 18 STAs may be performed for the 40 MHz bandwidth, and MU OFDMA based communication of a maximum of 18 STAs may be performed for the 80 MHz bandwidth.

According to the exemplary embodiment of the present invention, the maximum number of STAs performing communication by using the MU OFDMA based transmission within an overlapping time resource may be restricted to 18 STAs regardless of the size of the frequency bandwidth.

Alternatively, the maximum number of STAs performing communication by using the MU OFDMA transmission and the maximum number of STAs performing communication by using the MU MIMO transmission within an overlapping time resource may be restricted to 18 STAs regardless of the size of the frequency bandwidth.

Table 2 shown below indicates a maximum number of STAs in accordance with the bandwidth and MU OFDMA based transmission/MU MIMO based transmission.

TABLE 2

| Bandwidth (BW) | Allocation | Maximum number of STAs |
|---|---|---|
| 20 MHz | 9x26 for OFDMA | 9 |
| | 1x242 for MU MIMO | 4 |
| 40 MHz | 18x26 for OFDMA | 18 |
| | 1x242 for MU MIMO, 9x26 for OFDMA | 13 |
| | 2x242 for MU MIMO | 8 |
| 80 MHz | 37x26 for OFDMA | 18 |
| | 1x242 for MU MIMO, 28x26 for OFDMA | 22 or 18 |
| | 2x242 for MU MIMO, 19x26 for OFDMA | 26 or 18 |
| | 3x242 for MU MIMO, 10x26 for OFDMA | 22 or 18 |
| | 4x242 for MU MIMO, 1x26 for OFDMA | 17 |

Referring to Table 2, in case the MU OFDMA transmission is performed for the 20 MHz bandwidth, since each of the 9 26-tone resource units is allocated to each of the 9 STAs, the communication for a maximum of 9 STAs may be supported. In case the MU MIMO transmission is performed for the 20 MHz bandwidth, since a maximum of 4 STAs may be supported based on a 242-tone resource unit, communication for a maximum of 4 STAs may be supported in one 242-tone resource unit.

In case the MU OFDMA transmission is performed for the 40 MHz bandwidth, since each of the 18 26-tone resource units is allocated to each of the 18 STAs, the communication for a maximum of 18 STAs may be supported.

In case the MU MIMO transmission/MU OFDMA transmission are performed for the 40 MHz bandwidth, MU MIMO based communication for a maximum of 4 STAs may be supported in one 242-tone resource unit, and MU OFDMA based communication for a maximum of 9 STAs may be supported in the remaining 9 26-tone resource units.

In case the MU MIMO transmission is performed for the 40 MHz bandwidth, MU MIMO based communication for a maximum of 4 STAs may be supported in each of 2 242-tone resource units. Therefore, MU MIMO based communication for a maximum of 8 STAs may be supported.

In case the MU OFDMA transmission is performed for the 80 MHz bandwidth, 37 26-tone resource units may be allocated to each of the 18 STAs. As described above, the MU OFDMA transmission may support a maximum of 18 STAs. Alternatively, the MU OFDMA transmission/MU MIMO transmission may support a maximum of 18 STAs. Therefore, even in a case when 37 26-tone resource unit are available for usage, the communication of a maximum of 18 STAs may be supported.

MU MIMO transmission/MU OFDMA transmission may be performed for the 80 MHz bandwidth. In case one 242-tone resource unit is used for the MU MIMO transmission and the remaining 28 26-tone resource units are used for the MU OFDMA transmission, the communication of a maximum of 22 STAs may be supported, or the communication of a maximum of 18 STAs may be supported.

More specifically, as described above, in case the maximum number of STAs available for the support of performing the MU OFDMA transmission is restricted to 18 STAs, the maximum number of STAs available for support may be equal to 22 STAs, which corresponds to the sum of a maximum of 18 STAs that can perform MU OFDMA transmission and a maximum of 4 STAs that can perform MU MIMO transmission. In case the maximum number of STAs that can support the MU OFDMA transmission and the MU MIMO transmission is restricted to 18 STAs, the number of STAs performing the MU OFDMA transmission and the number of STAs performing MU MIMO transmission may be configured so that the maximum sum of the two numbers is equal to 18.

MU MIMO transmission/MU OFDMA transmission may be performed for the 80 MHz bandwidth. In case 2 242-tone resource units are used for the MU MIMO transmission and the remaining 19 26-tone resource units are used for the MU OFDMA transmission, the communication of a maximum of 26 STAs may be supported, or the communication of a maximum of 18 STAs may be supported.

More specifically, as described above, in case the maximum number of STAs available for the support of performing the MU OFDMA transmission is restricted to 18 STAs, the maximum number of STAs available for support may be equal to 26 STAs, which corresponds to the sum of a maximum of 18 STAs that can perform MU OFDMA transmission and a maximum of 8 STAs that can perform MU MIMO transmission in 2 242-tone resource units. In case the maximum number of STAs that can support the MU OFDMA transmission and the MU MIMO transmission is restricted to 18 STAs, the number of STAs performing the MU OFDMA transmission and the number of STAs performing MU MIMO transmission may be configured so that the maximum sum of the two numbers is equal to 18.

MU MIMO transmission/MU OFDMA transmission may be performed for the 80 MHz bandwidth. In case 3 242-tone resource units are used for the MU MIMO transmission and the remaining 10 26-tone resource units are used for the MU OFDMA transmission, by using the same method, the communication of a maximum of 22 STAs may be supported, or the communication of a maximum of 18 STAs may be supported.

MU MIMO transmission/MU OFDMA transmission may be performed for the 80 MHz bandwidth. In case 4 242-tone resource units are used for the MU MIMO transmission and the remaining 1 26-tone resource unit is used for the MU OFDMA based transmission, the communication of a maximum of 17 STAs may be supported.

Figure 16:
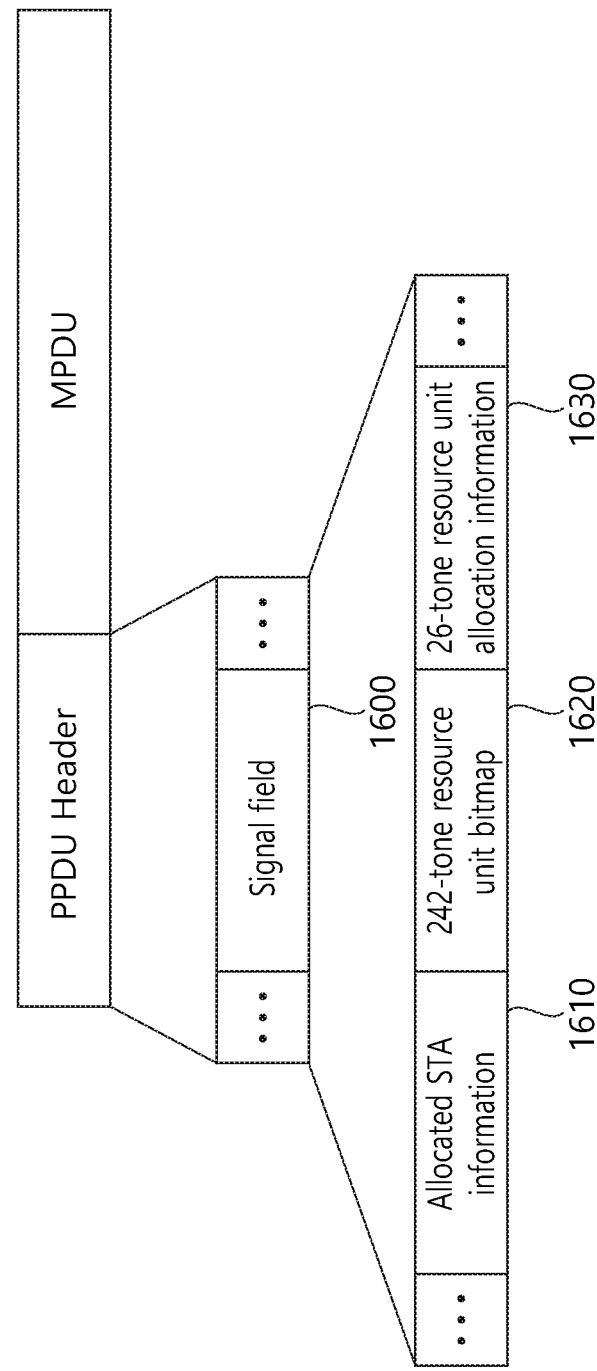
FIG. 16 is a conceptual view illustrating restriction in a number of STAs within a frequency bandwidth according to an exemplary embodiment of the present invention.

FIG. 16 is a conceptual view illustrating restriction in a number of STAs within a frequency bandwidth according to an exemplary embodiment of the present invention.

FIG. 16 discloses a resource allocation method for 242-tone resource units and 26-tone resource units.

Referring to FIG. 16, information on receiving STAs of an OFDMA packet (or information on a number of STAs receiving a PPDU) may be transmitted as allocation STA information 1610 based on a signal field (e.g., high efficiency (HE)-signal (SIG) A/HE-SIG B 1600) of a PPDU header.

Additionally, information on the 242-tone resource units being allocated within the entire bandwidth may be transmitted through the PPDU header. In order to indicate the information on the 242-tone resource units being allocated within the entire bandwidth, a bitmap on the 242-tone resource units (or 242 chunk bitmap) 1620 may be defined. The 242-tone resource unit bitmap 1620 may include information on the positions and number of 242-tone resource units being allocated within the entire bandwidth.

Additionally, information 1630 on the 26-tone resource units being allocated to the STA may be transmitted through the PPDU header. For example, information on the number of 26-tone resource units may be indicated based on n bits (e.g., 3 bits). The n bits, which correspond to the information 1630 on the allocation of the 26-tone resource units, may include information on the number of 26-tone resource units being allocated to the STA within a resource unit having a specific size (e.g., 9 26-tone resource units).

The information on the 242-tone resource units being allocated to the STA may be determined based on information on a number of users of an OFDMA packet and information on a number of users being allocated with 26-tone resource units.

For example, in case 2 242-tone resource units and 2 26-tone resource units are allocated to 4 STAs, each of the 2 242-tone resource units may be allocated to each of the 2 STAs, and each of the 2 26-tone resource units may be allocated to each of the 2 STAs.

As another example, in case 2 242-tone resource units and 3 26-tone resource units are allocated to 4 STAs, 2 242-tone resource units may be allocated to 1 STA, and 3 26-tone resource units may be allocated to each of the 3 STAs.

N may be assumed to represent the number of 242-tone resource units that are not allocated (i.e., non-allocated 242-tone resource units) after allocating 242-tone resource units to the frequency axis. In this case, the 242-tone resource units and the 26-tone resource units that are allocated to the frequency axis may be allocated based on a 242-tone resource unit bitmap and 3-bit 26-tone resource unit allocation information.

1 242-tone resource unit may be allocated for the 20 MHz bandwidth, 2 242-tone resource units may be allocated for the 40 MHz bandwidth, and 4 242-tone resource units may be allocated for the 80 MHz bandwidth. Therefore, the 242-tone resource unit bitmap may be defined as 1 bit for the 20 MHz bandwidth, and may be defined as 2 bits for the 40 MHz bandwidth, and may be defined as 4 bits for the 80 MHz bandwidth.

The 26-tone resource unit allocation information 1630 may indicate a number of 26-tone resource units being allocated to STAs within each of the N number of remaining 242-tone resource units (or non-allocated 242-tone resource units) that are not used as the 242-tone resource units. Therefore, the 26-tone resource unit allocation information may have a size of 3 bits*N.

Therefore, the 242-tone resource unit bitmap 1620 and the 3-bit 26-tone resource unit allocation information 1630 for the 20 MHz bandwidth may correspond to 1(242-tone resource unit bitmap)+N*3(26-tone resource unit allocation information). The 242-tone resource unit bitmap 1620 and the 3-bit 26-tone resource unit allocation information 1630 for the 40 MHz bandwidth may correspond to 2(242-tone resource unit bitmap)+N*3(26-tone resource unit allocation information). The 242-tone resource unit bitmap 1620 and the 3-bit 26-tone resource unit allocation information 1630 for the 80 MHz bandwidth may correspond to 4(242-tone resource unit bitmap)+N*3(26-tone resource unit allocation information).

The above-described signaling corresponds to a signaling method (or BW-optimized signaling method) for the 242-tone resource unit bitmap 1620 and the 3-bit 26-tone resource unit allocation information 1630 that are optimized in accordance with the bandwidth size.

According to the exemplary embodiment of the present invention, the signaling method (or BW common signaling method) for the 242-tone resource unit bitmap 1620 and the 3-bit 26-tone resource unit allocation information 1630 is disclosed regardless of the bandwidth size.

The 242-tone resource unit bitmap 1620 may be defined as 4 bits regardless of the bandwidth size, the 26-tone resource unit allocation information 1630 may be defined to have a size of 3 bits*N. Accordingly, the 242-tone resource unit bitmap 1620 and the 3-bit 26-tone resource unit allocation information 1630 may correspond to 4(242-tone resource unit bitmap)+N*3(26-tone resource unit allocation information) regardless of the bandwidth size.

In the above-described BW-optimized signaling and BW common signaling methods, N may be defined as N', and N' may correspond to a maximum number of 242-tone resource units that can be allocated to each bandwidth. More specifically, for the 20 MHz bandwidth, N' is equal to 1, and for the 40 MHz bandwidth, N' is equal to 2, and for the 80 MHz bandwidth, N' is equal to 4. N' may correspond to a fixed value instead of a variable value that varies in accordance with the current allocation status of the 242-tone resource units. Accordingly, a fixed design may be made for the signal field (e.g., HE-SIG B) transmitting the resource allocation information.

In case of defining N', the 26-tone resource unit allocation information may be fixed to 3 bits for the 20 MHz bandwidth, 6 bits for the 40 MHz bandwidth, and 12 bits for the 80 MHz bandwidth.

In case the size of the 242-tone resource unit bitmap 1620 is equal to 1 bit for the 20 MHz bandwidth, 2 bits for the 40 MHz bandwidth, and 4 bits for the 80 MHz bandwidth, a sum of the 26-tone resource unit allocation information 1630 and the 242-tone resource unit bitmap 1620 may be equal to 4 bits for the 20 MHz bandwidth, 8 bits for the 40 MHz bandwidth, and 16 bits for the 80 MHz bandwidth.

According to the exemplary embodiment of the present invention, information on whether or not MU MIMO transmission is performed on a resource unit having a predetermined size may be indicated. For example, in case the MU MIMO transmission is performed within a 242-tone resource unit, 1 bit indicating whether or not the MU MIMO transmission is performed on the 242-tone resource unit may be added and signaled.

In this case, 1 bit indicating whether or not MU MIMO based transmission is performed on each of the 242-tone resource units included in the entire frequency bandwidth may be added. Since the number of 242-tone resource units is equal to 1 within the 20 MHz bandwidth, 1 bit may be added. Since the number of 242-tone resource units is equal to 2 within the 40 MHz bandwidth, 2 bits may be added. And, since the number of 242-tone resource units is equal to 4 within the 80 MHz bandwidth, 4 bits may be added.

Accordingly, a sum of the 26-tone resource unit allocation information and the 242-tone resource unit bitmap and the bit(s) indicating whether or not MU MIMO based transmission is performed may be equal to 5 bits for the 20 MHz bandwidth, 10 bits for the 40 MHz bandwidth, and 16 bits for the 80 MHz bandwidth.

Figure 17:
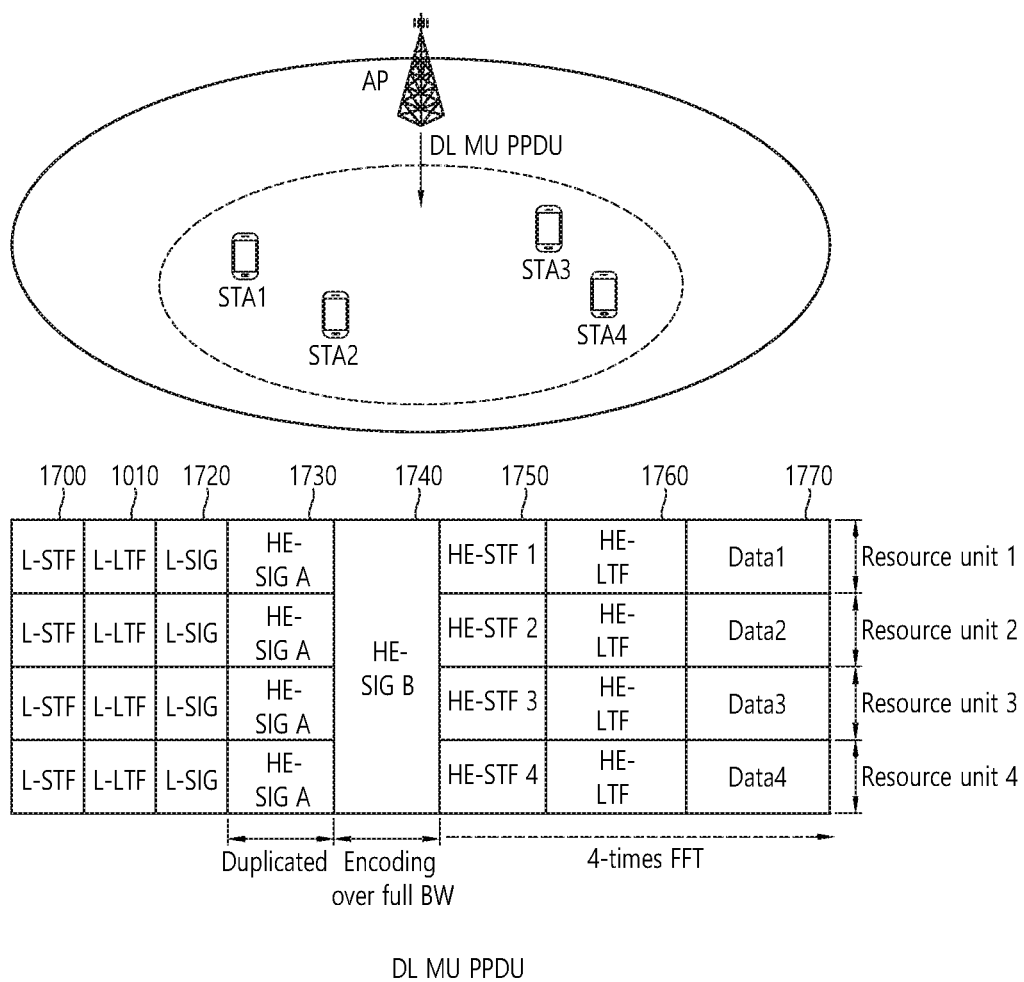
FIG. 17 is a conceptual view illustrating a DL MU PPDU format according to an exemplary embodiment of the present invention.

FIG. 17 is a conceptual view illustrating a DL MU PPDU format according to an exemplary embodiment of the present invention.

FIG. 17 discloses a DL U PPDU format that is transmitted by the AP based on OFDMA according to the exemplary embodiment of the present invention.

Referring to FIG. 17, a PPDU header of a DL MU PPDU may include a legacy-short training field (L-STF), a legacy-long training field (L-LTF), a legacy-signal (L-SIG), a high efficiency-signal A (HE-SIG A), a high efficiency-signal B (HE-SIG B), a high efficiency-short training field (HE-STF), a high efficiency-long training field (HE-LTF), and a data field (or MAC payload). The PPDU may be divided into a legacy part, which consists of a part starting from the PHY header to the L-SIG, and a high efficiency (HE) part, which consists of a part after the L-SIG.

The L-STF 1700 may include a short training orthogonal frequency division multiplexing (OFDM) symbol. The L-STF 1700 may be used for frame detection, automatic gain control (AGC), diversity detection, and coarse frequency/time synchronization.

The L-LTF 1710 may include a long training orthogonal frequency division multiplexing (OFDM) symbol. The L-LTF 1710 may be used for fine frequency/time synchronization and channel prediction.

The L-SIG 1720 may be used for transmitting control information. The L-SIG 1720 may include information on data transmission rate, data length, and so on.

The HE-SIG A 1730 may also include identification information for indicating a target STA that is to receive the DL MU PPDU. For example, the HE-SIG A 1730 may include an identifier of a specific STA (or AP) that is to receive the PPDU and information for indicating a group of specific STAs. Also, in case the DL MU PPDU is transmitted based on OFDMA or MIMO, the HE-SIG A 1730 may also include resource allocation information for the reception of the DL MU PPDU by the STA.

Additionally, the HE-SIG A 1730 may also include color bits information for BSS identification information, bandwidth information, tail bit, CRC bit, modulation and coding scheme (MCS) information on the HE-SIG B 1740, information on the number of symbols for the HE-SIG B 1740, and cyclic prefix (CP) (or guard interval (GI)) length information.

The HE-SIG B 1740 may include information on a length modulation and coding scheme (MCS) of a physical layer service data unit (PSDU) for each STA and a tail bit, and so on. Additionally, the HE-SIG B 1740 may also include information on the STA that is to receive the PPDU and resource allocation information based on OFDMA (or MU-MIMO information). In case the resource allocation information based on OFDMA (or MU-MIMO information) is included in the HE-SIG B 1740, the resource allocation information may not be included in the HE-SIG A 1730.

As described above, the HE-SIG A 1750 or the HE-SIG B 1760 may include receiving STA identification information and resource allocation information. The receiving STA identification information may sequentially include a plurality of STAs that are to receive the PPDU, and the resource allocation information may sequentially include information on the number of resource units that are allocated to each of the plurality of STAs. The HE-SIG A 1750 or the HE-SIG B 1760 may include receiving STA identification information and resource allocation information for a first resource unit group (or first resource units) and receiving identification information and resource allocation information for a second resource unit group (or second resource units).

Additionally, the HE-SIG A 1750 or the HE-SIG B 1760 may also directly indicate each of the first resource units and the second resource units that are being allocated to each of the plurality of STAs based on the bitmap information.

Additionally, the HE-SIG A 1750 or HE-SIG B 1760 may include the above-described 242-tone resource unit total allocation information, 242-tone resource unit individual allocation information, 26-tone resource unit individual allocation information, tone unit number information, per container resource allocation information, MU/SU transmission indication information, MU OFDMA/MU MIMO transmission indication information, and so on.

The fields before the HE-SIG B 1740 within the DL MU PPDU may each be transmitted from different transmission resources in a duplicated format. In case of the HE-SIG B 1740, the HE-SIG B 1740 being transmitted from part of the resource units (e.g., resource unit 1 and resource unit 2) may correspond to an independent field including separate information, and the HE-SIG B 1740 being transmitted from the remaining resource units (e.g., resource unit 3 and resource unit 4) may correspond to a duplicated format of the HE-SIG B 1740, which is transmitted from another resource unit (e.g., resource unit 1 and resource unit 2). Alternatively, the HE-SIG B 1740 may be transmitted in an encoded format within all of the transmission resources. And, the fields after the HE-SIG B 1740 may include separate information for each of the plurality of STAs receiving the PPDU.

The HE-STF 1750 may be used for enhancing automatic gain control estimation in a multiple input multiple output (MIMO) environment or an OFDMA environment.

More specifically, STA1 may receive HE-STF1, which is transmitted from the AP through resource unit1 and may then perform synchronization, channel tracking/estimation, and AGC, thereby being capable of decoding data field1 (or frame1). Similarly, STA2 may receive HE-STF2, which is transmitted from the AP through resource unit2 and may then perform synchronization, channel tracking/estimation, and AGC, thereby being capable of decoding data field2 (or frame2). STA3 may receive HE-STF3, which is transmitted from the AP through resource unit3 and may then perform synchronization, channel tracking/estimation, and AGC, thereby being capable of decoding data field3 (or frame3). And, STA4 may receive HE-STF4, which is transmitted from the AP through resource unit4 and may then perform synchronization, channel tracking/estimation, and AGC, thereby being capable of decoding data field4 (or frame4).

The HE-LTF 1760 may be used for estimating a channel in a MIMO environment or an OFDMA environment.

The inverse fast fourier transform (IFFT) size being applied to the HE-STF 1750 and the field after the HE-STF 1750 may be different from the IFFT size being applied to the field before the HE-STF 1750. For example, the IFFT size being applied to the HE-STF 1750 and the field after the HE-STF 1750 may be 4 times larger than the IFFT size being applied to the field before the HE-STF 1750. In case the STA may receive the HE-SIG A 1730 and may receive indication to receive a downlink PPDU based on the HE-SIG A 1730.

In this case, the STA may perform decoding based on the HE-STF 1750 and the FFT size that is changed starting from the field after the HE-STF 1750. Conversely, in case the STA fails to receive indication to receive the downlink PPDU based on the HE-SIG A 1730, the STA may stop the decoding process and may perform network allocation vector (NAV) configuration. A cyclic prefix (CP) of the HE-STF 1750 may have a size that is larger than the CP of other fields, and, during such CP period, the STA may change the FFT size and may perform decoding on the downlink PPDU.

The access point (AP) may allocate each of the plurality of the resource units to each of the plurality of stations (STAs) within the entire bandwidth and may transmit individual data fields (or frames), which correspond to each of the plurality of STAs, to each of the plurality of STAs through each of the plurality of resource units. As described above, the information on the allocation of each of the plurality of resource units to each of the plurality of STAs may be included in the HE-SIG A 1750 or the HE-SIG B 1760.

Figure 18:
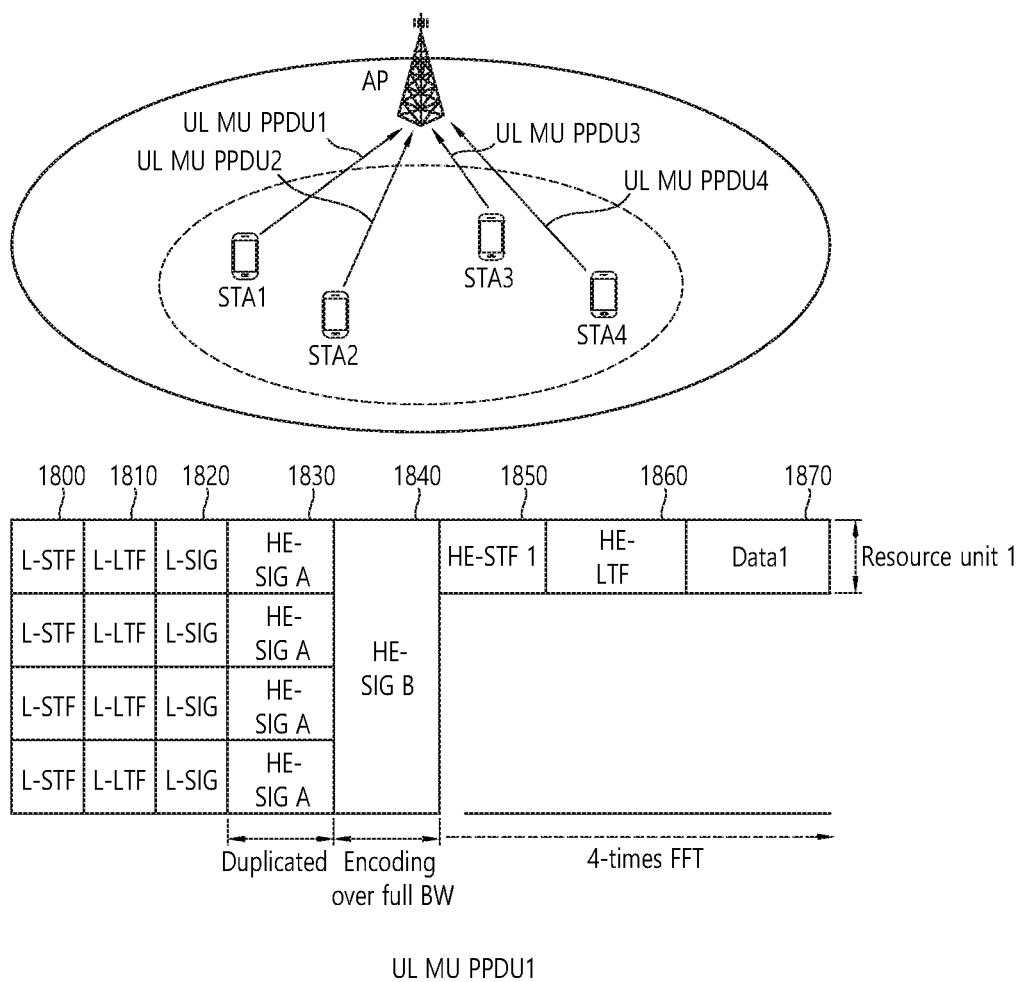
FIG. 18 is a conceptual view illustrating a transmission of a UL MU PPDU according to an exemplary embodiment of the present invention.

FIG. 18 is a conceptual view illustrating a transmission of a UL MU PPDU according to an exemplary embodiment of the present invention.

Referring to FIG. 18, a plurality of STAs may transmit a UL MU PPDU to the AP based on UL MU OFDMA.

The L-STF 1800, the L-LTF 1810, the L-SIG 1820, the HE-SIG A 1830, and the HE-SIG B 1840 may perform the functions, which are disclosed in FIG. 17. The information that is included in the signal field (L-SIG 1820, HE-SIG A 1830, and HE-SIG B 1840) may be generated based on the information included in the signal field of the received DL MU PPDU.

STA1 may perform uplink transmission through the entire bandwidth up to HE-SIG B 1840, and, then, STA1 may perform uplink transmission through the allocated bandwidth starting from HE-STF 1850. STA1 may deliver (or carry) an uplink frame through the allocated bandwidth (e.g., resource unit1) based on a UL MU PPDU. The AP may allocate an uplink resource corresponding to each of the plurality of STAs based on a DL MU PPDU (e.g., HE-SIG A/B), and each of the plurality of STAs may receive the corresponding uplink resource and then transmit a UL MU PPDU.

Figure 19:
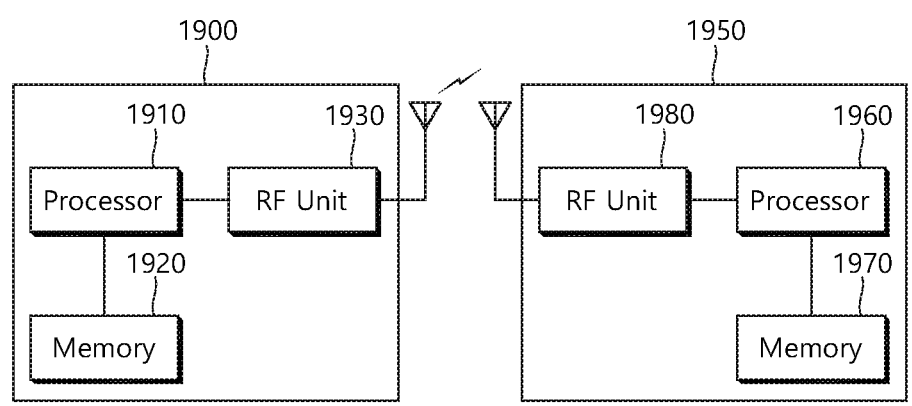
FIG. 19 is a block view illustrating a wireless device to which the exemplary embodiment of the present invention can be applied.

FIG. 19 is a block view illustrating a wireless device to which the exemplary embodiment of the present invention can be applied.

Referring to FIG. 19, as an STA that can implement the above-described exemplary embodiment, the wireless device 1900 may correspond to an AP 1900 or a non-AP station (STA) 1950.

The AP 1900 includes a processor 1910, a memory 1920, and a radio frequency (RF) unit 1930.

The RF unit 1930 is connected to the processor 1910, thereby being capable of transmitting and/or receiving radio signals.

The processor 1910 implements the functions, processes, and/or methods proposed in the present invention. For example, the processor 1910 may be implemented to perform the operations of the AP according to the above-described exemplary embodiments of the present invention. The processor may perform the operations of the AP, which are disclosed in the exemplary embodiments of FIG. 1 to FIG. 18.

For example, the processor 1910 may be configured to generate a PHY layer protocol data unit (PPDU) that is to be transmitted to a plurality of stations (STAs) and to transmit the generated PPDU to the plurality of STAs to at least one container that is allocated within the entire frequency band.

At this point, the PPDU may include multiple user (MU)/single user (SU) transmission indication information and per container resource allocation information. The MU/SU transmission indication information may include information on whether SU based transmission is performed or whether MU based transmission is performed within the entire bandwidth. The per container resource allocation information may include information on a number of STAs being allocated to each of at least one container, and each of the at least one container may include one first resource unit (e.g., 242-tone resource unit) and a plurality of second resource units (e.g., 26-tone resource units). A number of tones corresponding to the first resource unit may be greater than a number of tones corresponding to the second resource unit.

The PPDU may further include MU orthogonal frequency division multiplexing access (OFDMA)/MU multiple input multiple output (MIMO) transmission indication information corresponding to each of the at least one container. The MU OFDMA/MU MIMO transmission indication information may include information on whether or not the MU OFDMA transmission is performed and information on whether or not the MU MIMO transmission is performed within each of the at least one container.

In case the MU OFDMA/MU MIMO transmission indication information indicates the MU MIMO transmission within a specific container among the at least one container, the MU MIMO transmission may be performed within at least one tone unit that is included in the specific container, and the tone unit may correspond to a unit that divides the first resource unit included in the specific container or the plurality of second resource units into a plurality of groups.

Each of the at least one container for the PPDU transmission may further include each of at least one divided second resource unit, which is configured by dividing one second resource unit, and each of the at least one divided second resource unit may be combined (or associated) with one another so as to configure one second resource unit and to be allocated to the STA.

The STA 1950 includes a processor 1960, a memory 1970, and a radio frequency (RF) unit 1980.

The RF unit 1980 is connected to the processor 1960, thereby being capable of transmitting and/or receiving radio signals.

The processor 1960 implements the functions, processes, and/or methods proposed in the present invention. For example, the processor 1960 may be implemented to perform the operations of the STA according to the above-described exemplary embodiments of the present invention. The processor may perform the operations of the STA, which are disclosed in the exemplary embodiments of FIG. 1 to FIG. 18.

For example, the processor 1960 may be allocated with resource based on the MU/SU transmission indication information, the per container resource allocation information, and the MU OFDMA/MU MIMO transmission indication information, which are included in the PPDU that is received from the AP, and the processor 1960 may receive downlink data or transmit uplink data within the allocated resource.

The processor 1910 and 1960 may include an application-specific integrated circuit (ASIC), another chip set, a logical circuit, a data processing device, and/or a converter converting a baseband signal and a radio signal to and from one another. The memory 1920 and 1970 may include a read-only memory (ROM), a random access memory (RAM), a flash memory, a memory card, a storage medium, and/or another storage device. The RF unit 1930 and 1980 may include one or more antennas transmitting and/or receiving radio signals.

When the exemplary embodiment is implemented as software, the above-described method may be implemented as a module (process, function, and so on) performing the above-described functions. The module may be stored in the memory 1920 and 1970 and may be executed by the processor 1910 and 1960. The memory 1920 and 1970 may be located inside or outside of the processor 1910 and 1960 and may be connected to the processor 1910 and 1960 through a diversity of well-known means.

What is claimed is:

1. A method in a wireless local area network (WLAN), the method comprising:
   receiving, by a station (STA) among a plurality of STAs, a physical (PHY) layer protocol data unit (PPDU) that is transmitted to the plurality of STAs, wherein the PPDU is transmitted through an entire frequency bandwidth including at least one container; and
   decoding, by the STA, the PPDU for the at least one container,
   wherein the PPDU includes resource allocation information,
   wherein the resource allocation information includes first information on a number of STAs being allocated to each of the at least one container,
   wherein each of the at least one container includes one first resource unit or a plurality of second resource units,
   wherein a number of tones related to the first resource unit is greater than a number of tones related to the plurality of second resource units,
   wherein a specific container of the at least one container includes only the first resource unit and multiple user multiple input multiple output (MU MIMO) is performed for the first resource unit, and
   wherein the resource allocation information further includes second information on a number of STAs performing the MU MIMO.

2. The method of claim 1, wherein the resource allocation information further includes a 2-bit indicator or a 3-bit indicator, and
   wherein the number of the STAs performing the MU MIMO is configured for each specific container based on the 2-bit indicator or the 3-bit indicator.

3. The method of claim 1,
   wherein the MU MIMO is performed within at least one tone unit being included in the specific container, and
   wherein the at least one tone unit is related to a unit dividing the first resource unit or the plurality of second resource units included in the specific container into a plurality of groups.

4. The method of claim 1, wherein a number of the at least one container increases based on an increase in a size of the entire frequency bandwidth, and
   wherein a number of STAs capable of being allocated to each of the at least one container is restricted based on the size of the entire frequency bandwidth.

5. The method of claim 1, wherein each of the at least one container further comprises each of at least one divided second resource unit, the at least one divided second resource unit being configured by dividing one second resource unit, and
   wherein each of the at least one divided second resource unit is related with one another to configure one second resource unit and to be allocated to the plurality of STAs.

6. A station (STA) among a plurality of STAs in a wireless local area network (WLAN), the STA comprising:
   a transceiver transmitting and receiving radio signals; and
   a processor being operatively connected to the trasnceiver,
   wherein the processor is configured to:
   receive a physical (PHY) layer protocol data unit (PPDU) that is transmitted to the plurality of STAs, wherein the PPDU is transmitted through an entire frequency bandwidth including at least one container; and
   decode the PPDU for the at least one container,
   wherein the PPDU includes resource allocation information,
   wherein the resource allocation information includes first information on a number of STAs being allocated to each of the at least one container,
   wherein each of the at least one container includes one first resource unit or a plurality of second resource units,
   wherein a number of tones related to the first resource unit is greater than a number of tones related to the plurality of second resource units,
   wherein a specific container of the at least one container includes only the first resource unit and multiple user multiple input multiple output (MU MIMO) is performed for the first resource unit, and
   wherein the resource allocation information further includes second information on a number of STAs performing the MU MIMO.

7. The STA of claim 6, wherein the resource allocation information further includes a 2-bit indicator or a 3-bit indicator, and
   wherein the number of the STAs performing the MU MIMO is configured for each specific container based on the 2-bit indicator or the 3-bit indicator.

8. The STA of claim 6,
   wherein the MU MIMO is performed within at least one tone unit being included in the specific container, and
   wherein the at least one tone unit is related to a unit dividing the first resource unit or the plurality of second resource units included in the specific container into a plurality of groups.

9. The STA of claim 6, wherein a number of the at least one container increases based on an increase in a size of the entire frequency bandwidth, and
   wherein a number of STAs capable of being allocated to each of the at least one container is restricted based on the size of the entire frequency bandwidth.

10. The STA of claim 6, wherein each of the at least one container further comprises each of at least one divided second resource unit, the at least one divided second resource unit being configured by dividing one second resource unit, and
    wherein each of the at least one divided second resource unit is related with one another to configure one second resource unit and to be allocated to the plurality of STAs.

11. A method for allocating resource units in a wireless local area network (WLAN), the method comprising:
    generating, by an access point (AP), a physical (PHY) layer protocol data unit (PPDU) that is to be transmitted to a plurality of stations (STAs); and transmitting, by the AP, the PPDU to the plurality of STAs through an entire frequency bandwidth including at least one container,
wherein the PPDU includes resource allocation information,
wherein the resource allocation information includes first information on a number of STAs being allocated to each of the at least one container,
wherein each of the at least one container includes one first resource unit or a plurality of second resource units,
wherein a number of tones related to the first resource unit is greater than a number of tones related to the plurality of second resource units,
wherein a specific container of the at least one container includes only the first resource unit and multiple user multiple input multiple output (MU MIMO) is performed for the first resource unit, and
wherein the resource allocation information further includes second information on a number of STAs performing the MU MIMO.

* * * * *